(12) United States Patent
Tohne et al.

(10) Patent No.: US 7,440,583 B2
(45) Date of Patent: Oct. 21, 2008

(54) WATERMARK INFORMATION DETECTION METHOD

(75) Inventors: Toshio Tohne, Gunma (JP); Takashi Hashimoto, Saitama (JP); Masahiko Suzaki, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 10/553,632

(22) PCT Filed: Apr. 23, 2004

(86) PCT No.: PCT/JP2004/005863

§ 371 (c)(1),
(2), (4) Date: Aug. 18, 2006

(87) PCT Pub. No.: WO2004/098171

PCT Pub. Date: Nov. 11, 2004

(65) Prior Publication Data

US 2007/0005977 A1    Jan. 4, 2007

(30) Foreign Application Priority Data

Apr. 25, 2003   (JP)   .............................. 2003-122260

(51) Int. Cl.
*G06K 9/00* (2006.01)
*G06K 15/00* (2006.01)

(52) U.S. Cl. ........................ 382/100; 358/3.28; 358/1.9; 358/464; 382/165; 382/181; 382/190

(58) Field of Classification Search ................. 382/100, 382/232, 240; 713/176, 179; 358/3.28, 1.9; 380/201, 51, 54, 210, 252, 287

See application file for complete search history.

(56) References Cited

U.S. PATENT DOCUMENTS

| | | | | |
|---|---|---|---|---|
| 5,315,098 A | * | 5/1994 | Tow | 235/494 |
| 5,576,532 A | * | 11/1996 | Hecht | 235/494 |
| 5,864,742 A | * | 1/1999 | Gasper et al. | 399/366 |
| 5,949,055 A | * | 9/1999 | Fleet et al. | 235/469 |
| 6,763,121 B1 | * | 7/2004 | Shaked et al. | 382/100 |
| 7,039,215 B2 | * | 5/2006 | Suzaki | 382/100 |
| 2001/0028727 A1 | * | 10/2001 | Naito et al. | 382/100 |
| 2002/0180995 A1 | * | 12/2002 | Yen et al. | 358/1.9 |
| 2003/0026450 A1 | * | 2/2003 | Powell et al. | 382/100 |
| 2004/0052401 A1 | * | 3/2004 | Suzaki | 382/100 |
| 2007/0079124 A1 | * | 4/2007 | Maeno | 713/176 |

FOREIGN PATENT DOCUMENTS

EP    0871318 A    10/1998

(Continued)

*Primary Examiner*—Andrew W. Johns
*Assistant Examiner*—Nancy Bitar
(74) *Attorney, Agent, or Firm*—Rabin & Berdo, P.C.

(57) ABSTRACT

There is provided a watermark information detecting method capable of detecting confidential information accurately from a document including confidential information. In this method, a filtering process is performed on the whole surface of an input image (S310), and a position of signal is obtained by using a signal position searching template in order for the sum of filter output value to be maximum (S320). Then a signal border is determined (S340). Even when the image is expanded or contracted due to displacement of paper, etc., the signal position can be correctly detected and confidential information can be correctly detected from a document including confidential information.

20 Claims, 29 Drawing Sheets

FOREIGN PATENT DOCUMENTS

| JP | 09-179494 | 7/1997 |
| JP | 10-200743 | 7/1998 |
| JP | 2001-53954 | 2/2001 |
| JP | 2001-78006 | 3/2001 |
| JP | 2003-101762 | 4/2003 |

* cited by examiner

UNIT E

UNIT A

UNIT B

FIG.7A
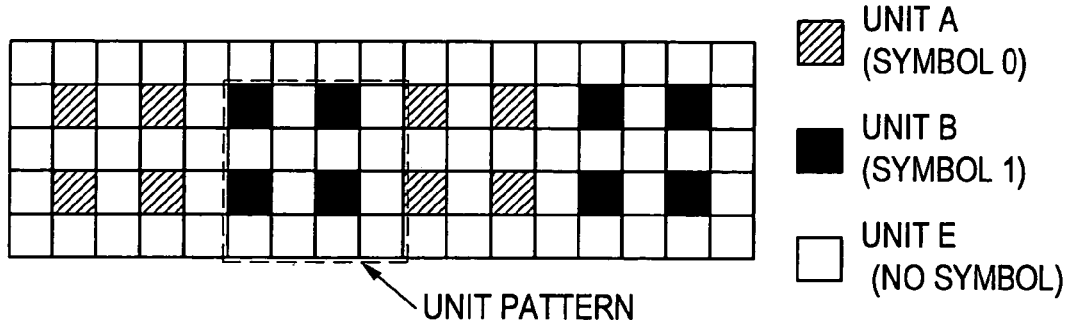
- UNIT A (SYMBOL 0)
- UNIT B (SYMBOL 1)
- UNIT E (NO SYMBOL)
FIG.7B
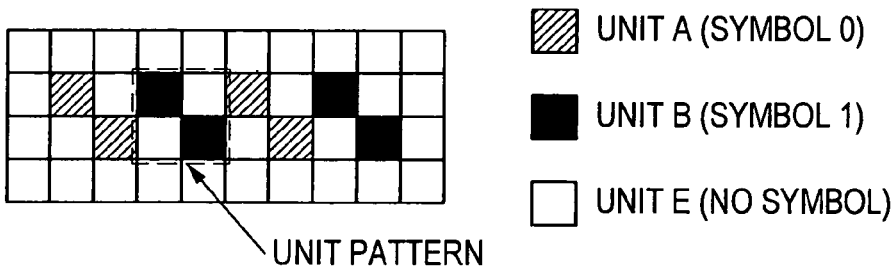
- UNIT A (SYMBOL 0)
- UNIT B (SYMBOL 1)
- UNIT E (NO SYMBOL)
FIG.7C
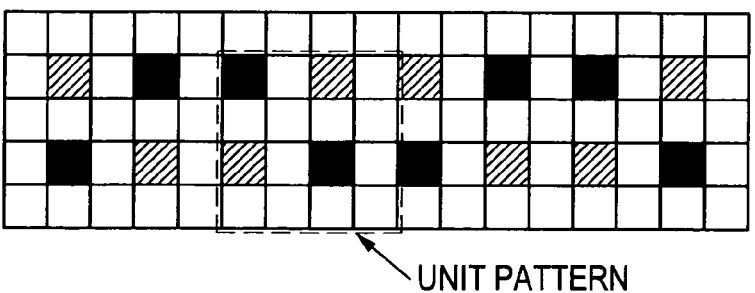
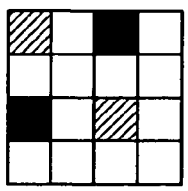 UNIT PATTERN INDICATING SYMBOL 0
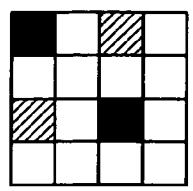 UNIT PATTERN INDICATING SYMBOL 1

UNIT PATTERN MATRIX

RETRIEVED DATA CODE UNIT

BIT STRING RESTRUCTURED BY
CERTAINTY FACTOR OPERATION
(DATA CODE)

WATERMARK INFORMATION DETECTION METHOD

CROSS-REFERENCE TO RELATED APPLICATION

This application is entitled to the benefit of PCT International Application No. PCT/JP2004/005863, filed on Apr. 23, 2004, which claimed priority of Japanese Patent Application No. JP2003-122260, filed on Apr. 25, 2003.

TECHNICAL FIELD

The present invention relates to a method of adding confidential information in a form other than character to a document image, and relates to a technology of detecting confidential information from a printed document including confidential information.

BACKGROUND ART

In "electronic watermark" with information for preventing copying and counterfeiting and confidential information invisibly embedded, storing and data passing are assumed to be carried out on electronic media, which makes it possible to detect information reliably without deterioration and loss of information embedded watermarked. Similarly to this, there is required a method of embedding confidential information, which is not visually unsightly in a form of other than character and cannot be falsified easily, in a printed document in order to prevent alteration and copying of a document printed on a paper medium.

As an information embedding method for monochrome binary document used most widely for a printed matter, the following technology is known.

[Patent Document 1] JP-A-2001-78006 "METHOD AND DEVICE FOR EMBEDDING AND DETECTING WATERMARK INFORMATION IN BLACK-AND-WHITE BINARY DOCUMENT PICTURE"

A minimum rectangle surrounding an arbitrary character string is divided into some blocks, which are divided into two groups (group 1 and 2) (the number of groups may be three or more). When a signal is 1, for example, a feature quantity in each block of group 1 is increased while a feature quantity in a block of group 2 is reduced. When a signal is 0, a reverse operation is carried out. The feature quantity in a block is such as the number of pixels and weight of character in a character area, a distance from the point of scanning the block vertically and to the point of reaching the character area first.

[Patent Document 2] JP-A-2001-53954 "DEVICE AND METHOD FOR EMBEDDING INFORMATION AND READING INFORMATION, DIGITAL WATERMARK SYSTEM AND RECORDING MEDIUM"

Setting the width and height of the maximum rectangle surrounding one character as the feature quantity for the character, a symbol is assumed to be indicated by a classified pattern of magnitude relation of the feature quantity among two or more characters. For example, six feature quantities can be defined from three characters, and listing the combinations of the patterns of magnitude relation, and classifying these combinations into two groups to give a symbol. When the information to be embedded is "0" and the combination pattern of the feature quantity of character selected to indicate this is "1", one of the six feature quantities is varied by expanding its character area. The pattern to be varied is selected in order for the amount of varying to be minimum.

[Patent Document 3] JP-A-09-179494 "CONFIDENTIAL INFORMATION RECORDING METHOD"

It is assumed that a printer with 400 dpi or more is used for printing. Information is quantified to express the information by a distance from a reference point mark to a position determination mark (dot number).

[Patent Document 4] JP-A-10-200743 "DOCUMENT PROCESSING UNIT"

Information is expressed according to whether a screen line of a multi-line screen (a special screen configured by minute parallel lines) is moved backward or not.

In the Patent Documents 1 and 2, however, changing font and layout becomes required due to the changes of pixel configuring the character of document image, character spacing and line spacing. In the Patent Documents 3 and 4, in addition, since there is required high-accuracy detection process per pixel of the input image read out from an input device such as scanner in detecting, dirt on paper and addition of noise in printing and reading have a great impact on information detecting accuracy.

In the Patent Documents 1 to 4, as described above, when detecting confidential information embedded by inputting the printed document in a computer again by an input device such as scanner, image deformation caused by dirt on the printed document and rotation generated in inputting allow a noise component to be included in the input image, which makes it difficult to extract the confidential information correctly.

As the case of having a large impact on the information detecting accuracy with regard to the Patent Documents 3 and 4, there are the case of inclining of the printed document in reading from an input device and the case of local expansion and contraction of image due to displacement of paper in printing or inputting an image.

DISCLOSURE OF THE INVENTION

The present invention has been achieved in view of the aforementioned problems in the conventional watermark information detecting method, and an object of the invention is to provide a novel and improved watermark information detecting method capable of detecting confidential information correctly from a document including confidential information.

According to the present invention, in order to solve the problems, there is provided a watermark information detecting method comprising the following steps:

(1) image inputting step for reading a printed document with confidential information embedded as an input image, by preparing plural dot patterns with a direction of wave and/or wavelength changed according to an arrangement of dots, giving one symbol to one of the dot patterns and arranging the dot patterns combined with each other;

(2) a filtering step for obtaining, in each pixel of the input image, a filter type matrix related to a type of detection filter with a maximum output value among all detection filters and a filter output value matrix related to the output value of the detection filter, by performing filtering of the input image after preparing the detection filter having the same wave direction and wavelength as the dot patterns to be the same number of types in order to detect the dot patterns from the input image;

(3) a position searching step for determining the position of the dot patterns in order for the sum of the output values of the detection filter corresponding to a grid point of a position searching template to be maximum, while moving the position searching template in each area divided in a predetermined size with regard to the filter output value matrix;

(4) a symbol determining step for obtaining a symbol matrix by determining the symbol of the dot patterns embedded in a location determined in the position searching step from the type of the detection filter in the filter type matrix, corresponding to the location;

(5) a border determining step for determining a border of the area with the dot patterns embedded based on the predetermined dot patterns embedded in the printed document in advance; and (6) an information decoding step for decoding the confidential information embedded in the printed document based on the dot patterns embedded inside the border.

According to this method, the position of dot patterns can be obtained in order for the sum of filter output value to be maximum by performing filtering process on the whole surface of the input image and by using the signal position searching template. Accordingly, even when the image is expanded or contracted due to displacement of paper, etc., the position of dot patterns can be correctly detected and confidential information can be correctly detected from the printed document.

Here, "dot pattern" includes various conceptions:

(1) "signal unit" with a rectangular composed by a predetermined width and height as a unit of signal;

(2) "symbol unit" with a concrete symbol assigned to the signal unit;

(3) "unit pattern" with a specific symbol given to the number of repetitions of the symbol unit and to an arrangement pattern; and so on.

In the border determining step, a row and a column with the specific dot patterns embedded continuously can be determined as the border of the area with the confidential information embedded, for the row and the column in the symbol matrix. Embedding specific dot patterns continuously in the border of the area with the confidential information embedded makes it possible to detect the border easily.

The position searching step can comprise an initial position searching step for searching the initial position of the position searching template for detecting the dot patterns with high degree of accuracy. For example, the initial position of the position searching template can be determined at almost the central position of the input image. At almost the central position of the input image, it is possible to detect the dot patterns with high accuracy due to little impact caused by displacement of input image. Or, in order to avoid the area including the character, etc. of the input image, the initial position of the position searching template can be determined at the position with most nondense distribution of a comparatively dark pixel corresponding to character (a pixel with small luminance value) of the input image.

In the position searching step, the position of the dot patterns can be determined by referring to the output value of the detection filter at the neighborhood as well as the output value of the detection filter at the position of the dot patterns to be determined, when searching the position of the dot patterns by the position searching template. According to this method, as in the case, for example, where the character area of the input image is included in the position of the dot patterns to be determined, even when the output value of the detection filter cannot be sufficiently obtained, the position of the dot patterns can be determined appropriately.

There can be further comprised: a dot pattern number decoding step for decoding information on the number of dot patterns embedded in the printed document from the input image; and a position correcting step for correcting the position of the dot patterns when the number of the dot patterns detected from the input image does not match the number of the dot patterns decoded in the dot pattern number decoding step. According to this method, detecting the information on the number of dot patterns from the input image and referring to the information make it possible to correct even when there is a mistake in the position searching by the position searching template. With this, the position of the dot patterns can be detected more correctly and confidential information can be correctly detected from the printed document.

There can be further comprised an alteration detecting step including a step of extracting a feature quantity of the printed document and a step of calculating the feature quantity of the input image. According to this method, in addition to the above effects, alteration of the contents of printed document can be detected if they are altered.

The alteration detecting step can further comprise a step of binarizing the input image for binarizing the input image per area in accordance with a binarized parameter per area embedded in the printed document. According to this method, even when a certain area in the input image is largely altered and the number of black pixels is different from the number of black pixels in an original document image, going beyond an area of correct binary threshold, a correct binary threshold can be set by referring to the information on the binary threshold of the neighborhood area.

In the border determining step, the dot patterns that can be searched from the symbol matrix may be determined in advance between embedding means and detecting means in the confidential information, to determine the border based on the dot patterns.

BRIEF DESCRIPTION OF THE DRAWINGS

FIG. 7A is an explanatory diagram showing an example of a method of embedding a symbol in the watermark image.

FIG. 7B is an explanatory diagram showing an example of a method of embedding a symbol in the watermark image.

FIG. 7C is an explanatory diagram showing an example of a method of embedding a symbol in the watermark image.

BEST MODE FOR CARRYING OUT THE INVENTION

Figure 1:
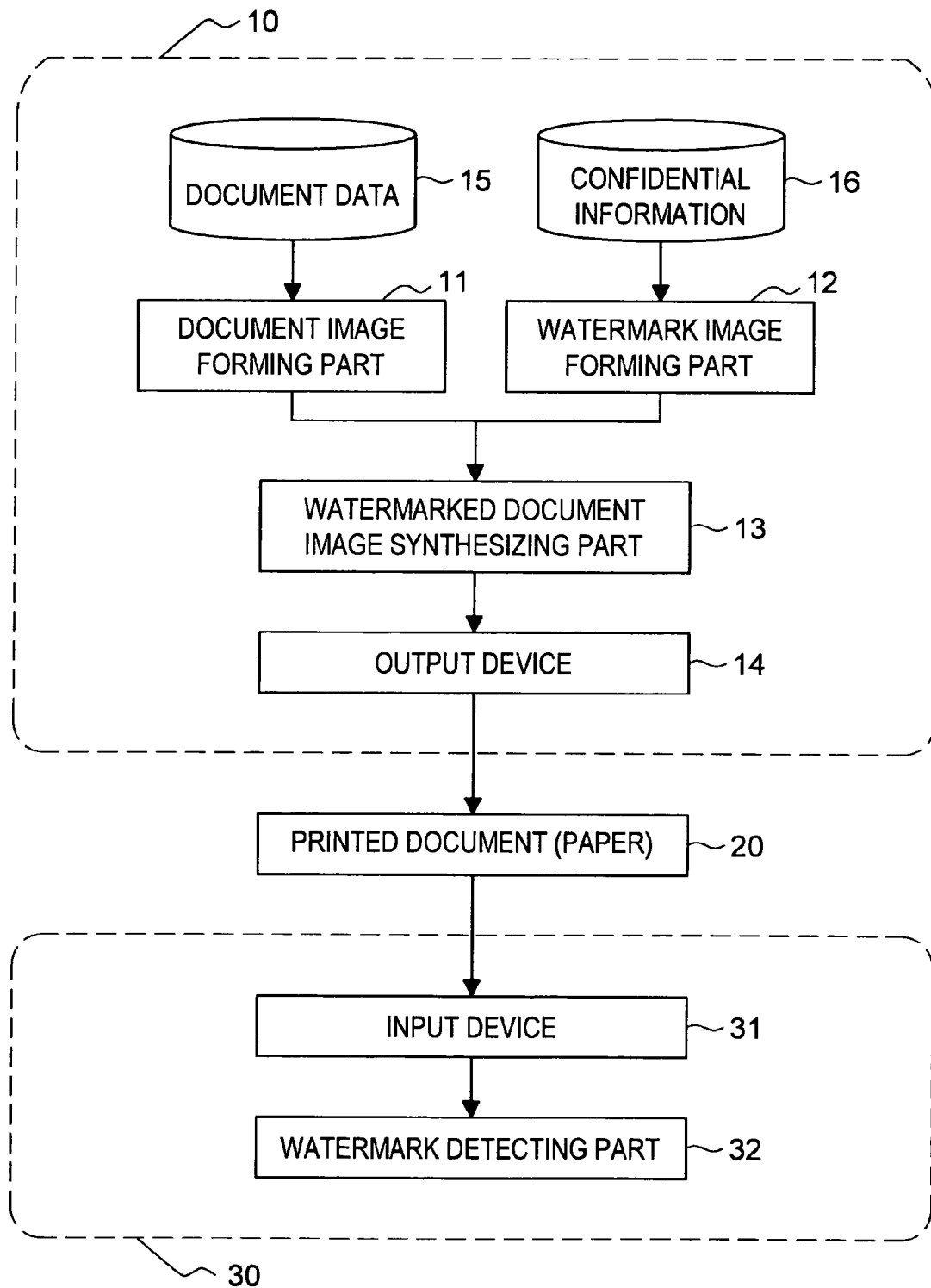
FIG. 1 is an explanatory diagram showing configurations of a watermark information embedding device and a watermark information detecting device.

Hereinafter, the preferred embodiments of a watermark information detecting method according to the present invention will be described in reference to the accompanying drawings. Same reference numerals are attached to components having same functions in following description and the accompanying drawings, and a description thereof is omitted.

FIRST EMBODIMENT

FIG. 1 is an explanatory diagram showing configurations of a watermark information embedding device and a watermark information detecting device according to this embodiment.

(Watermark Information Embedding Device 10)

A watermark information embedding device 10 configures a document image based on document data and confidential information to be embedded in a document and performs printing on a paper medium. The watermark information embedding device 10 includes, as shown in FIG. 1, a document image forming part 11; a watermark image forming part 12; a watermarked document image synthesizing part 13; and an output device 14. Document data 15 is data created by a document creating tool, etc. Confidential information 16 is information (character string, image and sound data) to be embedded in a form other than character in a paper medium.

In the document image forming part 11, an image is created with the document data 15 printed on a paper. More specifically, a white pixel area in a document image is a part without printing while a black pixel area is a part with black coating applied. In this embodiment, although it is assumed that printing is performed on white paper by using a black ink (monochrome), the present invention is not restricted to this example. The present invention can also be applied to the case of performing color printing (polychrome).

The document image forming part 11 is not necessarily required. In this case, a document image is used instead of the document data 15, to be input to the watermark image forming part 12.

The watermark image forming part 12 performs N-dimensional coding (N is two or more) for the confidential information 16 digitized and converted to numerical value and assigns each symbol of codeword to signals prepared in advance. The signals express a wave having an arbitrary direction and wavelength by arranging dots in a rectangular area with an arbitrary size, and the symbol is assigned to the direction of wave and the wavelength. The watermark image is configured by arranging these signals on an image according to a certain rule.

The watermarked document image synthesizing part 13 creates a watermarked document image by overlapping the document image with the watermark image. The output device 14 is an output device such as printer and prints the watermarked document image on a paper medium. Therefore, the document image forming part 11, the watermark image forming part 12 and the watermarked document image synthesizing part 13 may be realized as one function in a printer driver.

A printed document 20 is constituted by printing by embedding the confidential information 16 in the original document data 15, and physically stored and managed.

(Watermark Information Detecting Device 30)

A watermark information detecting device 30 is a device for loading a document printed on a paper medium as an image and restoring the embedded confidential information 16. The watermark information detecting device 30, as shown in FIG. 1, includes an input device 31 and a watermark detecting part 32.

The input device 31 is an input device such as scanner and loads the document 20 printed on paper into a computer as a gray image with multilevel tone. The watermark detecting part 32 performs filtering process for the input image and detects the embedded signal. The symbol is restored from the detected signal and retrieves the embedded confidential information 16.

There will be described operations of the watermark information embedding device 10 and watermark information detecting device 30 thus configured. First, the operation of the watermark information embedding device 10 will be described in reference to FIGS. 1 to 11.

(Document Image Forming Part 11)

The document data 15 is data including font information and layout information and assumed to be created by a word-processing program. The document image forming part 11 creates the image with a document printed on paper page by page based on the document data 15. This document image is a monochrome binary image, in which a white pixel (value is 1) on the image is a background while a black pixel (value is 0) is a character area (an area with an ink applied).

(Watermark Image Forming Part 12)

The confidential information 16 is various data such as character, sound and image. The watermark image forming part creates a watermark image to be overlapped as a background of document image from the information.

Figure 2:
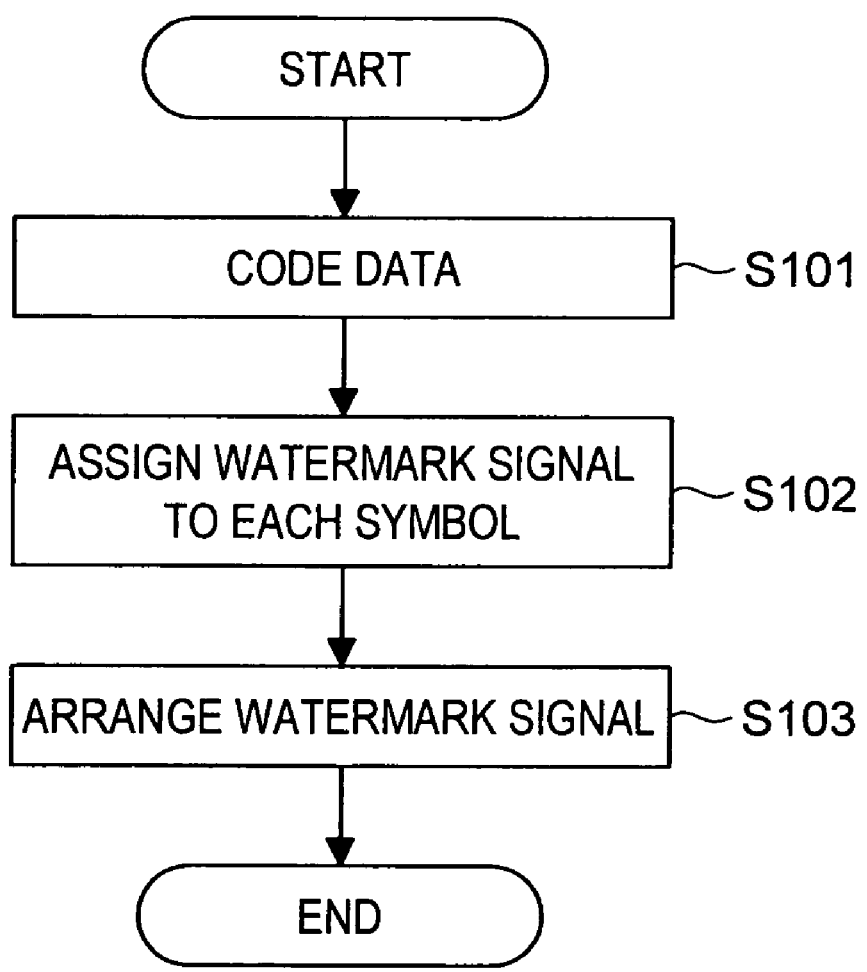
FIG. 2 is a flowchart showing a flow of process of a watermark image forming part 12.

FIG. 2 is a flowchart showing a flow of process of the watermark image forming part 12.

First, the confidential information 16 is converted into an N-dimensional code (step S101). Although N can be arbitrarily determined, N is set at 2 to facilitate the description in this embodiment. Therefore, the code generated in step S101 is a two-dimensional code and expressed by a bit string of 0 and 1. In step S101, data may be coded as it is, or encoded data may be coded.

Next, a watermark signal is assigned to each symbol of codeword (step S102). The watermark signal expresses a wave having arbitrary wavelength and direction according to the arrangement of dot (black pixel), and will be described later.

Further, a signal unit corresponding to the bit string of coded data is arranged on the watermark image (step S103).

Figure 3A:
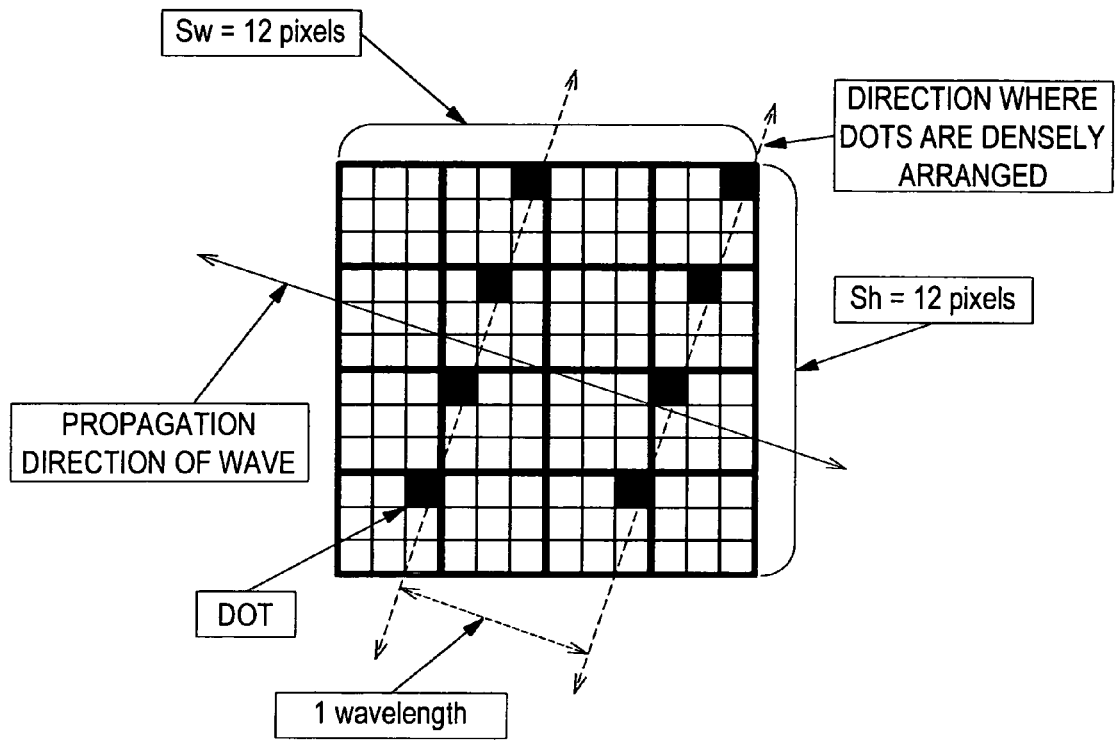
FIG. 3A is an explanatory diagram showing an example of a watermark signal of unit A.
Figure 3B:
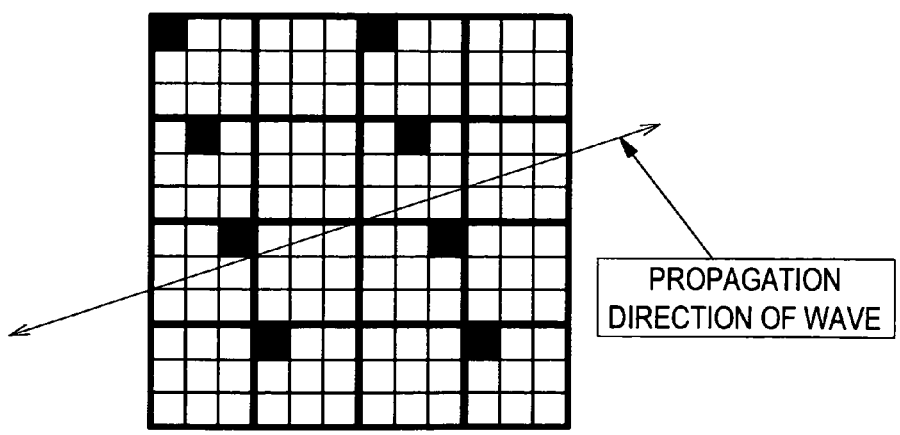
FIG. 3B is an explanatory diagram showing an example of a watermark signal of unit B.

In the step S102, the watermark signal assigned to each symbol of codeword will be described. FIGS. 3A and 3B are an explanatory diagrams showing an example of the watermark signal.

The width and height of the watermark signal are set as Sw and Sh, respectively. Although Sw and Sh may be different, there is set as Sw=Sh to facilitate the description in this embodiment. The unit of length is expressed by the number of pixels, and there is set as Sw=Sh=12 in the example of FIGS. 3A and 3B. The size of the signal printed on paper depends on the resolution of the watermark image. For example, when the watermark image is an image with 600 dpi (dot per inch: unit of resolution, dot number per inch), the width and height of the watermark signal in FIGS. 3A and 3B become 12/600=0.02 (inch) on the printed document.

Hereinafter, a rectangle with its width and height at Sw and Sh will be referred to as "signal unit" as a unit of signal. In FIG. 3A, the distance between dots is dense in the direction of arctan (3) (arctan is an inverse function of tan) with regard to a horizontal axis, and the propagation direction of wave is arctan (−1/3). Hereinafter, this signal unit is referred to as unit A. In FIG. 3B, the distance between dots is dense in the direction of arctan (−3) with regard to a horizontal axis, and the propagation direction of wave is arctan (1/3). Hereinafter, this signal unit is referred to as unit B.

Figure 4:
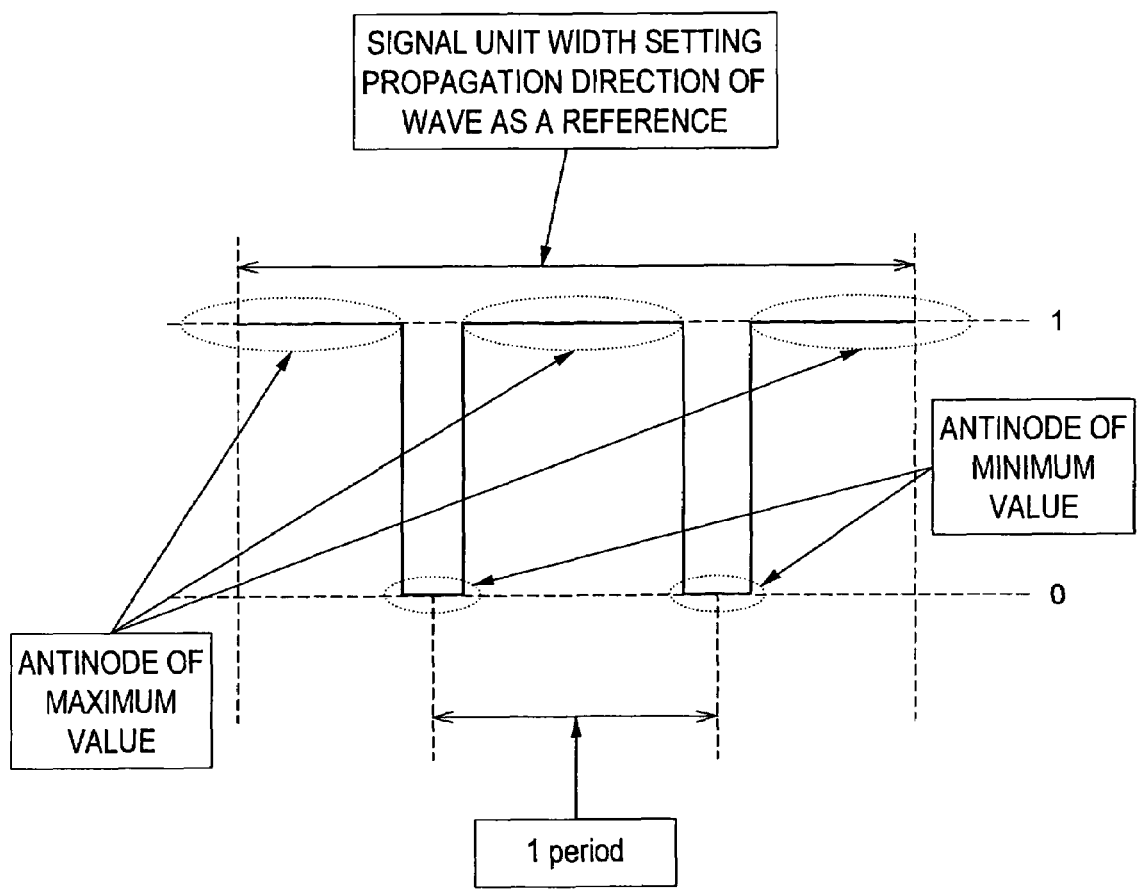
FIG. 4 is a sectional view seeing a change of pixel value in FIG. 3A from a direction of arctan (1/3).

FIG. 4 is a sectional view seeing a change of pixel value in FIG. 3A from a direction of arctan (1/3). In FIG. 4, the part with dots arranged is an antinode of minimum value (the point with largest amplitude) while the part without dots arranged is an antinode of maximum value.

In addition, since there are two areas per unit where the dots are densely arranged, the frequency per unit becomes 2 in this example. Since the propagate direction of wave is vertical to the direction where the dots are densely arranged, the wave of unit A becomes arctan (−1/3) with regard to a horizontal direction while the wave of unit B becomes arctan (1/3).

In this embodiment, symbol 0 is assigned to the watermark signal expressed by unit A while symbol 1 is assigned to the watermark signal expressed by unit B. These will be referred to as a symbol unit.

Figure 5C:
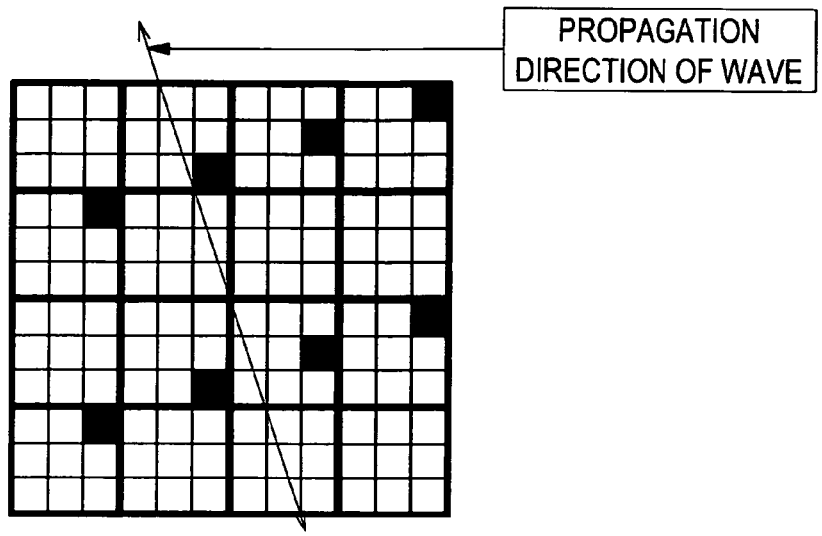
FIG. 5C is an explanatory diagram showing an example of a watermark signal of unit C.
Figure 5D:
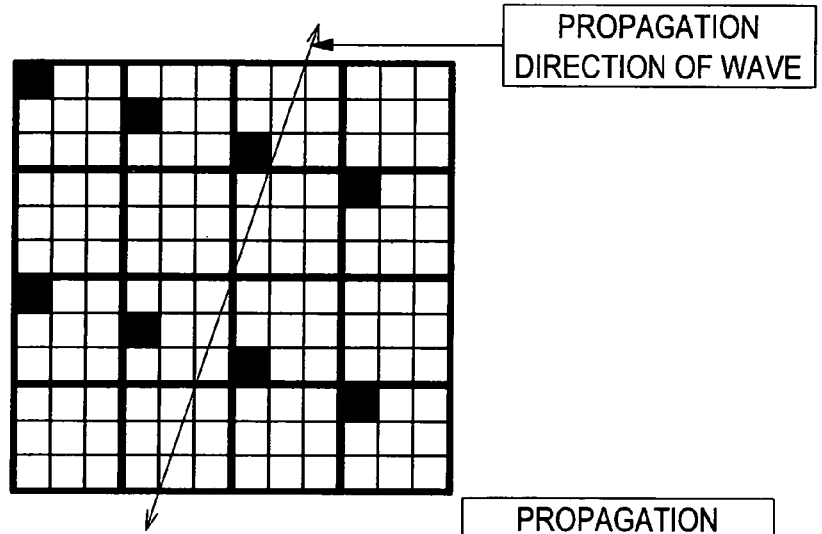
FIG. 5D is an explanatory diagram showing an example of a watermark signal of unit D.
Figure 5E:
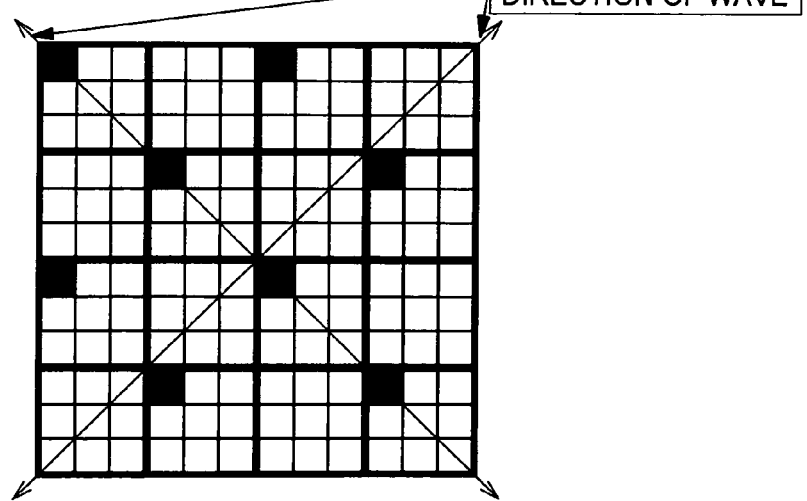
FIG. 5E is an explanatory diagram showing an example of a watermark signal of unit E.

Other than the dot arrangements of watermark signal shown in FIGS. 3A and 3B, the dot arrangements may be considered as shown in FIGS. 5C to 5E, for example. In FIG. 5C, the distance between dots is dense in the direction of arctan (1/3) with regard to a horizontal axis, and the propagation direction of wave is arctan (−3). Hereinafter, this signal unit is referred to as unit C.

In FIG. 5D, the distance between dots is dense in the direction of arctan (−1/3) with regard to a horizontal axis, and the propagation direction of wave is arctan (3). Hereinafter, this signal unit is referred to as unit D. In FIG. 5E, the distance between dots is dense in the direction of arctan (1) with regard to a horizontal axis, and the propagation direction of wave is arctan (1). In FIG. 5E, however, there can be considered that the distance between dots is dense in the direction of arctan (1) with regard to a horizontal axis, and the propagation direction of wave is arctan (1). Hereinafter, this signal unit is referred to as unit E.

As described above, there may be plural patterns of unit combination to which symbols 0 and 1 are assigned, other than the combinations of assignment carried out in advance. Accordingly, it is also possible to make it impossible for the third party (rigger) to decode the embedded signal easily without disclosing which watermark signal is assigned to which symbol.

Further in step S102 shown in FIG. 2, when the confidential information is coded by four-dimensional code, it is also possible, for example, to assign a symbol 0 of codeword to the unit A, to assign a symbol 1 of codeword to the unit B, to assign a symbol 2 of codeword to the unit C and to assign a symbol 3 of codeword to unit D.

In the examples of watermark signal shown in FIGS. 3A to 5E, since all numbers of dots per unit are equal, close arrangement of these units makes an apparent contrast of the watermark image uniform. Therefore on the printed paper, it seems that a gray image with a single density is embedded as a background.

To create such an effect, for example, the unit E is defined as a background unit (a signal unit without a symbol assigned), and this is closely arranged to make the background of the watermark image. When the symbol unit (units A and B) is embedded in the watermark image, the background unit (unit E) at the position for the symbol unit to be embedded and the symbol unit (units A and B) are replaced.

Figure 6A:
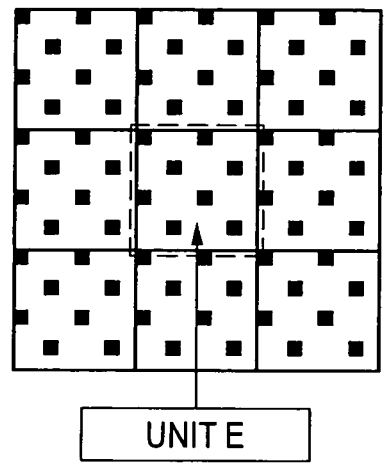
FIG. 6A is an explanatory diagram showing a background image that indicates the case where the unit E is defined as a background unit and set as the background of watermark images closely arranged.
Figure 6B:
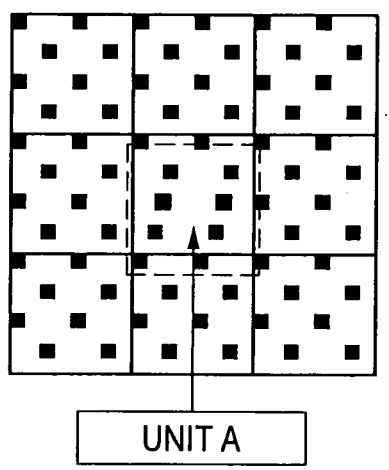
FIG. 6B is an explanatory diagram showing a background image that indicates an example of embedding the unit A in the background image of FIG. 6A.
Figure 6C:
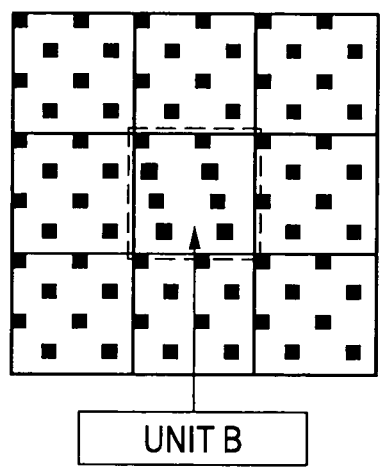
FIG. 6C is an explanatory diagram showing a background image that indicates an example of embedding the unit B in the background image of FIG. 6A.

FIG. 6A is an explanatory diagram showing the case where the unit E is defined as a background unit, and this is closely arranged to make the background of the watermark image. FIG. 6B shows an example where the unit A is embedded in a background image of FIG. 6A while FIG. 6C shows an example where the unit B is embedded in a background image of FIG. 6A. In this embodiment, although there will be described the method of setting the background unit as the background of the watermark image, the watermark image may be generated by arranging only the symbol unit.

Next, there will be described the method of embedding one symbol of codeword in the watermark image in reference to FIGS. 7A to 7C.

FIGS. 7A to 7C are explanatory diagrams showing an example of a method of embedding a symbol in the watermark image. Here, there will be described the case of embedding a bit string "0101", as an example.

As shown in FIGS. 7A and 7B, the same symbol unit is repeatedly embedded. This is to prevent the case where the character in the document cannot be detected in signal detection when the character is overlapped on the embedded symbol unit. The number of repetitions of symbol unit and the arrangement pattern thereof (hereinafter, referred to as unit pattern) are arbitrary.

As an example of unit pattern, therefore, the number of repetitions can be set at four (four symbol units exist in one unit pattern) as shown in FIG. 7A while the number of repetitions can be set at two (two symbol units exist in one unit pattern) as shown in FIG. 7B, or, the number of repetitions may be set at one (only one symbol unit exists in one unit pattern).

Although one symbol is assigned to one symbol unit in FIGS. 7A and 7B, the symbol may be assigned to the arrangement pattern of symbol unit as shown in FIG. 7C.

How many bits of information can be embedded in one page of watermark image depends on the size of signal unit, the size of unit pattern and the size of document image. The number of signals embedded in horizontal and vertical directions, which is assumed to be well-known, may be calculated by signal detection, or by calculating back from the size of the image input from an input device and the size of signal unit.

Assuming that the numbers of unit patterns that can be embedded are Pw in a horizontal direction and Ph in a vertical direction in one page of watermark image, the unit pattern at an arbitrary position in the image is to be expressed as U (x, y), x=1~Pw, y=1~Ph, and U (x, y) will be referred to as "unit pattern matrix". The number of bits that can be embedded in one page is referred to as "embedded bit number", which is expressed by Pw×Ph.

Figure 8:
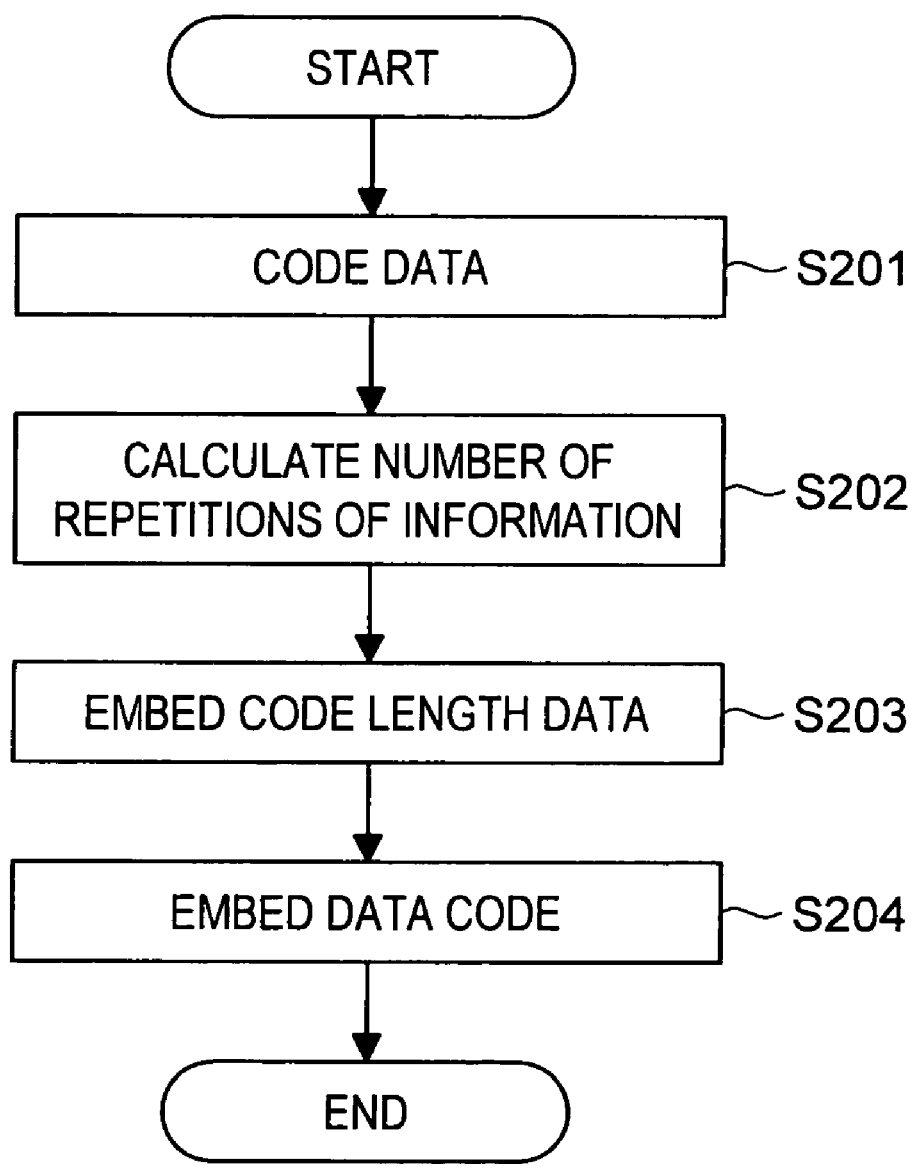
FIG. 8 is a flowchart showing a method of embedding confidential information in the watermark image.

FIG. 8 is a flowchart showing a method of embedding the confidential information 16 in the watermark image. Here, there will be the case of embedding the same information repeatedly in a single (one page of) the watermark image. This is for making it possible to retrieve the embedded information by embedding the same information repeatedly, even when the embedded information is lost with the whole of one unit pattern covered when overlapping the watermark image with the document image.

First, the confidential information 16 is converted into an N-dimensional code (step S201), which is the same as step S101 in FIG. 2. Hereinafter, the coded data is referred to as data code while the expression of data code by the combination of unit patterns is referred to as data code unit Du.

Next, there is calculated the number of repetitive embeddings of the data code unit in one image from the code length (here, bit number) of data code and the number of embedded bits (step S202). In this embodiment, the code length data of the data code is inserted in the first row of the unit pattern matrix. Alternately, there may be considered the case where, the code length of the data code being set as a fixed length, the code length data is not embedded in the watermark image.

The number Dn of embeddings of the data code unit is calculated by the following expression, setting the data code length as Cn:

$$Dn = \left\lfloor \frac{Pw \times (Ph-1)}{Cn} \right\rfloor$$

wherein [A] is the maximum integer not exceeding A.

Here, setting a residue at Rn (Rn=Cn−(Pw×(Ph−1))), the data code unit with the number of Dn and the unit pattern corresponding to the first Rn bits of the data code are to be embedded in the unit pattern matrix. However, it is not necessary to embed the Rn bits in the residue part.

Figure 9:
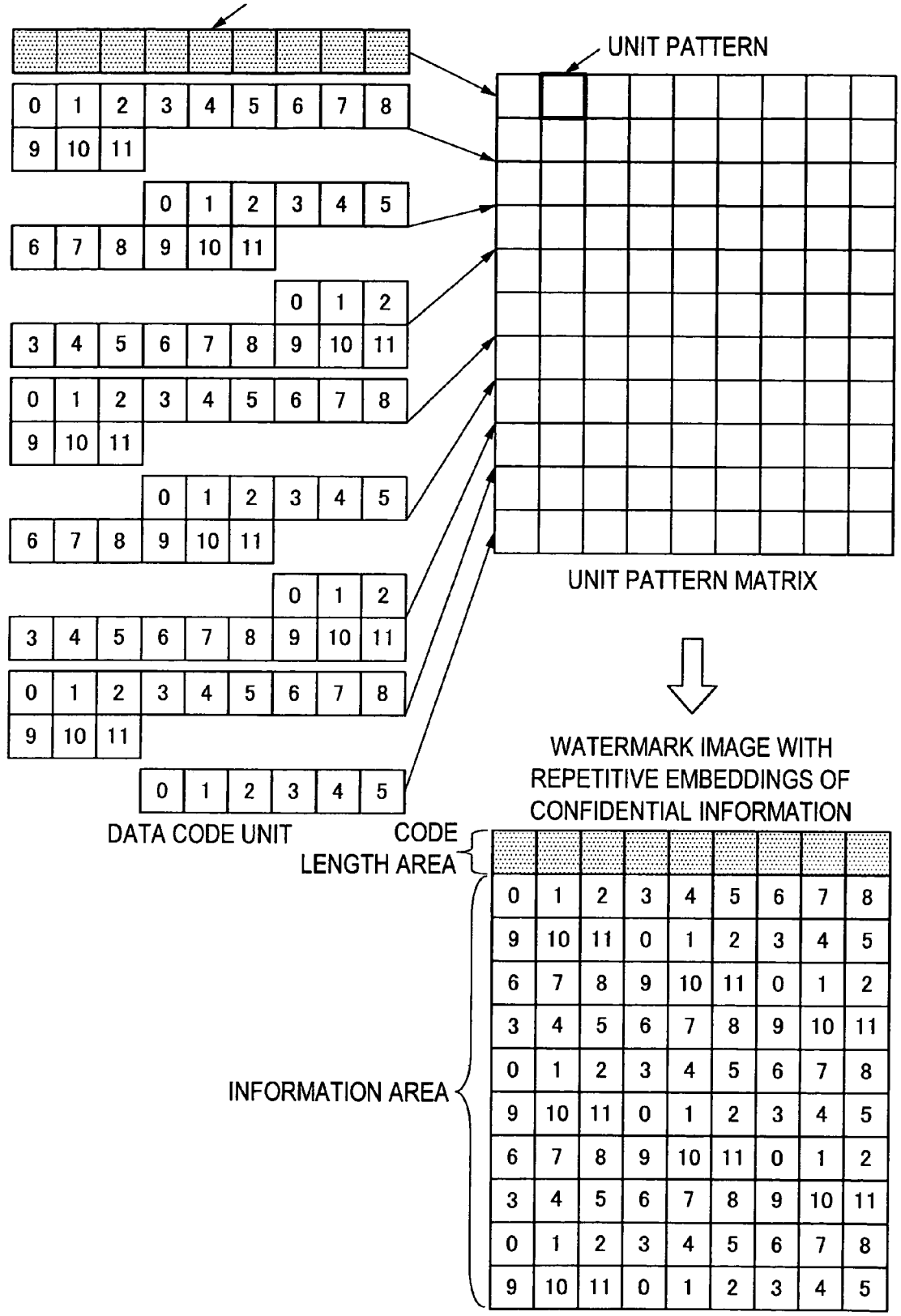
FIG. 9 is an explanatory diagram showing an example of a method of embedding confidential information in the watermark image.

In the description of FIG. 9, the size of the unit pattern matrix is set at 9×11 (11 rows and 9 columns) while the data code length is set at 12 (what is attached with numbers 0 to 11 in this Figure expresses each code word of data code).

Next, the code length data is embedded in the first row of the unit pattern matrix (step S203). In the example of FIG. 9, although there is described the example where the code length is expressed by 9-bit data and embedded only once, it is also possible to embed the code length data repeatedly similarly to the data code when the width Pw of unit pattern matrix is large enough.

Further, the data code unit is repeatedly embedded in the second row and thereafter of the unit pattern matrix (step S204). As shown in FIG. 9, there is embedded in a row direction from MSB (most significant bit) of the data code or LSB (least significant bit) thereof. The example of FIG. 9 shows the example of embedding the data code unit seven times and embedding the first 6 bits of data code.

The data may be embedded so as to be successive in a row direction as shown in FIG. 9 or a column direction.

The watermark image in the watermark image forming part 12 has been described. Next, the watermarked document image synthesizing part 13 in the watermark information-embedding device 10 will be described.

(Watermarked Document Image Synthesizing Part 13)

In the watermarked document image synthesizing part 13, the document image created in the document image forming part 11 and the watermark image created in the watermark image forming part 12 are overlapped. The value of each pixel in the watermarked document image is calculated by a logic operation (AND) of the pixel values corresponded to the document image and the watermark image. In other words, when either the document image or the watermark image is 0 (black), the pixel value of the watermarked document image is 0 (black). In other cases, the pixel value thereof is 1 (white).

Figure 10:
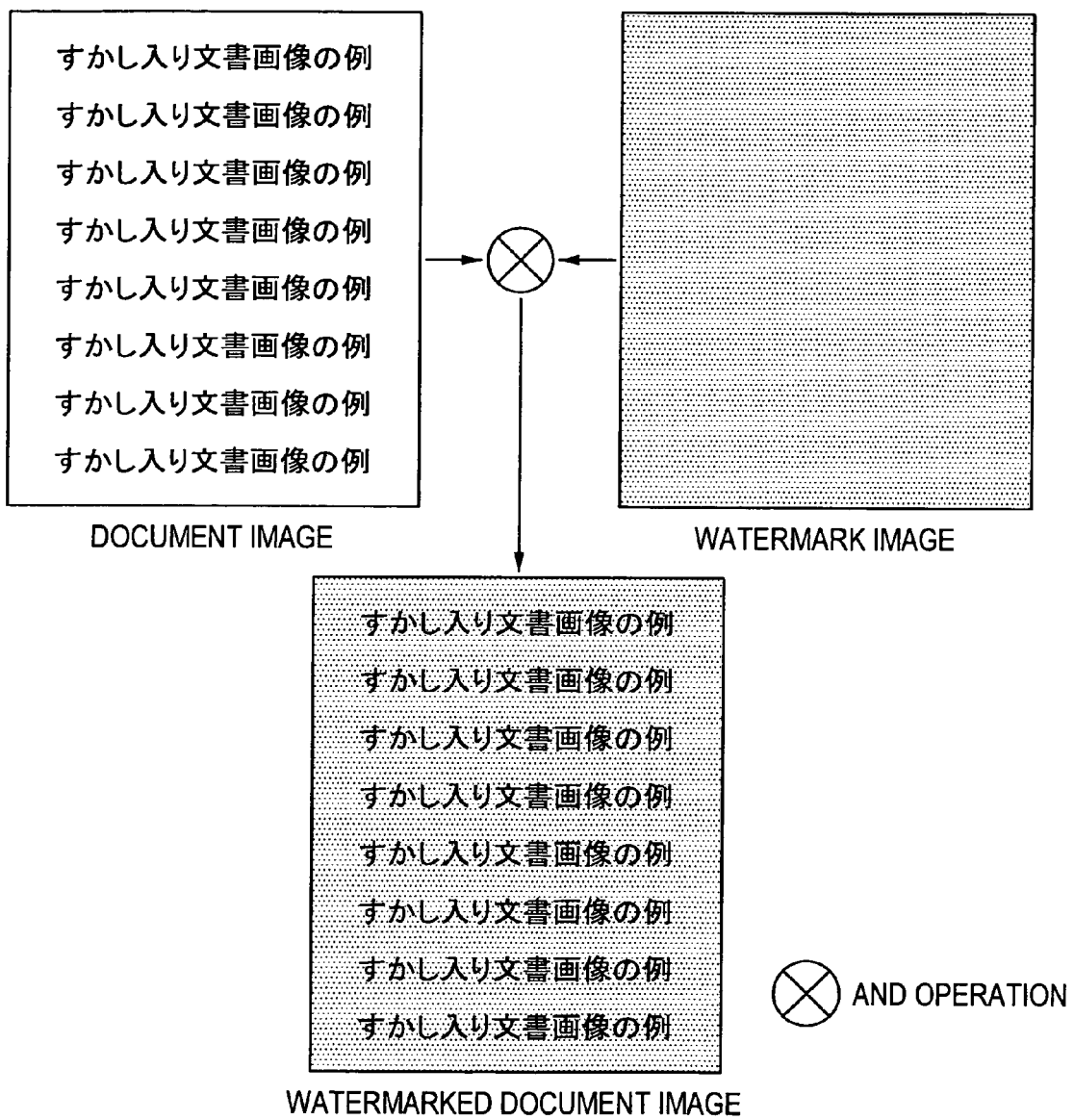
FIG. 10 is an explanatory diagram showing an example of a watermarked document image.
Figure 11:
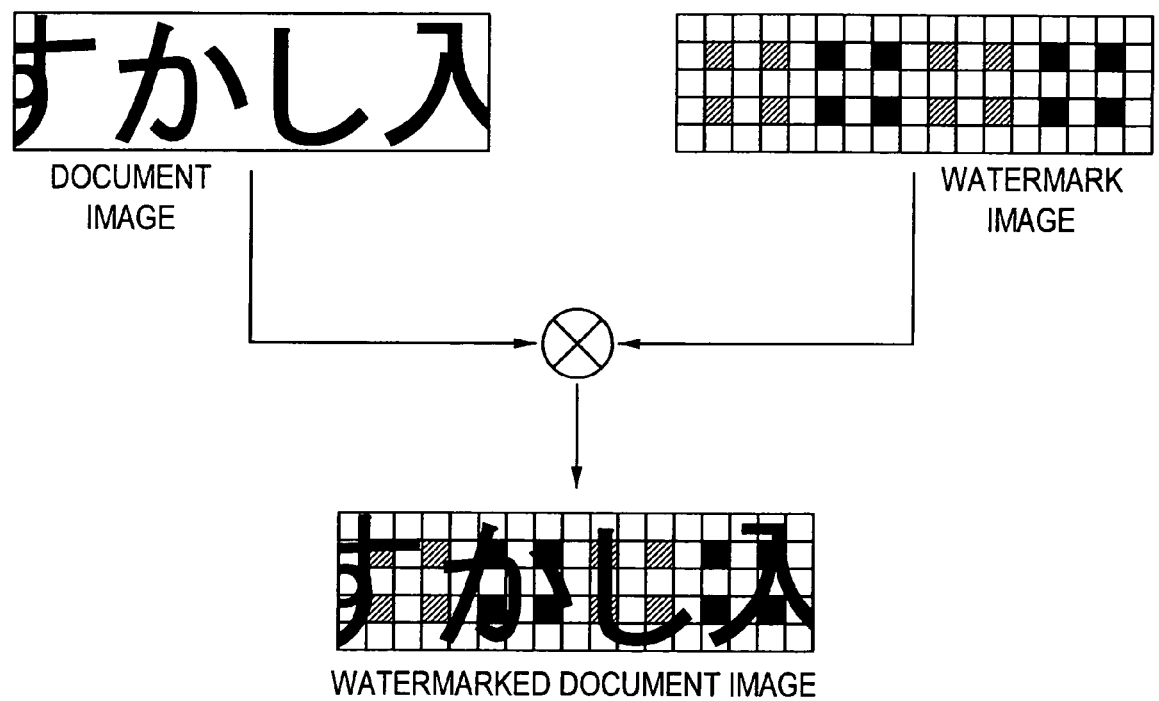
FIG. 11 is an explanatory diagram of partially enlarged view of FIG. 10.

FIG. 10 is an explanatory diagram showing an example of a watermarked document image. FIG. 11 is an explanatory diagram of partially enlarged view of FIG. 10. Here, the pattern of FIG. 7A is used as the unit pattern. The watermarked document image is output from the output device 14.

The operation of the watermark information-embedding device 10 has been described as above.

Next, the operation of the watermark information detecting device 30 will be described in reference to FIGS. 12 to 19.

(Watermark Detecting Part 32)

Figure 12:
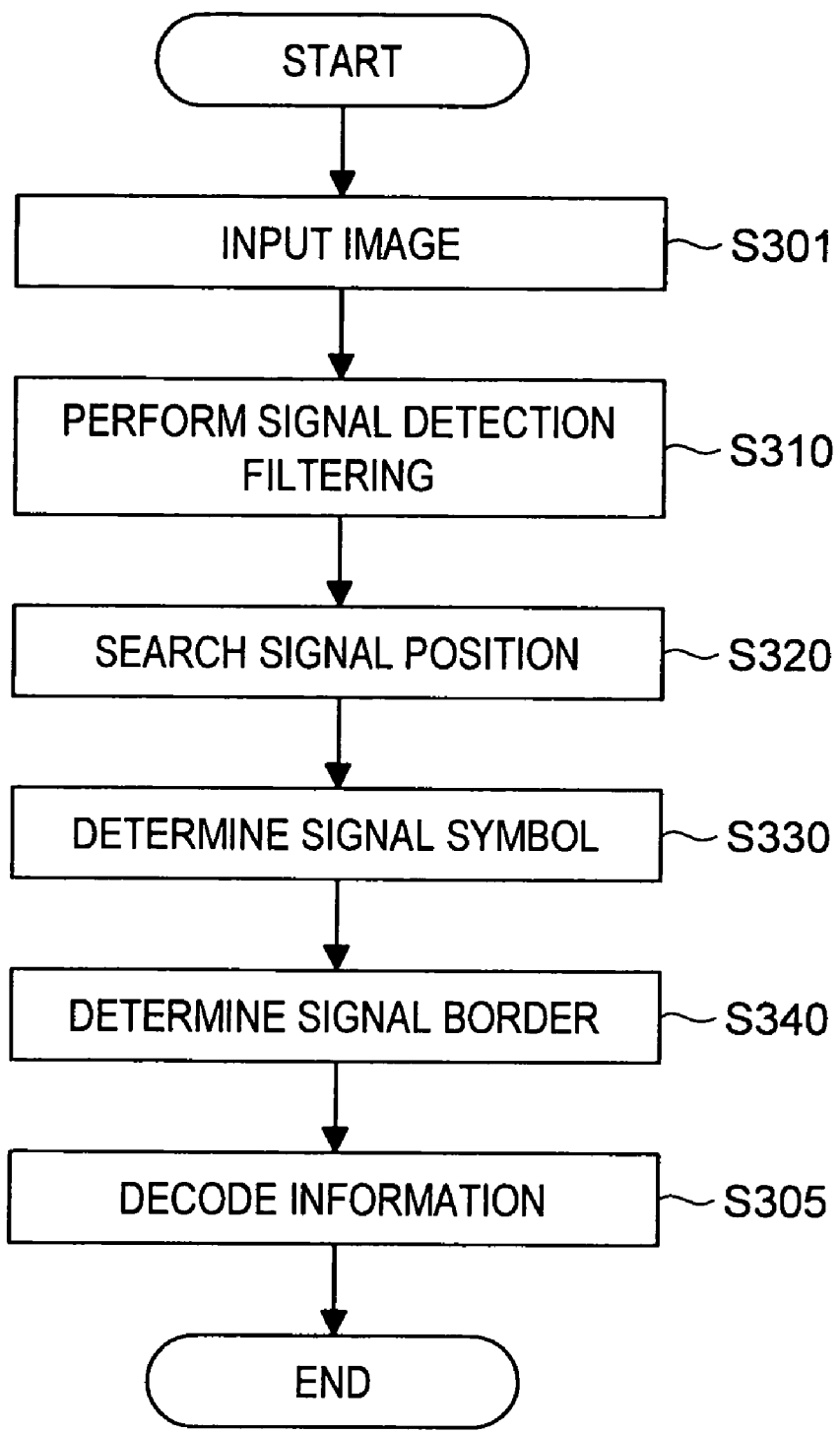
FIG. 12 is a flowchart showing a flow of process of a watermark detecting part 32 in a first embodiment.

FIG. 12 is a flowchart showing a flow of process of the watermark detecting part 32.

First, the watermarked document image is input to a memory, etc. of a computer by using the input device 31 such as scanner (step S301). This image is referred to as an input image. The input image is a multilevel image and will be described as a gray image with 256 gradations. Although the resolution of the input image (resolution when reading in the input device 31) may be different from that of the watermarked document image created in the watermark information embedding device 10, description will be given assuming that the resolution is the same as that of the image created in the watermark information embedding device 10. In addition, there will be described the case where one unit pattern is configured by one symbol unit.

<Signal Detection Filtering Step (step S310)>

In step S310, the whole of input image is subjected to a filtering process, and the calculation and comparison of the filter output value are performed. The calculation of filter output value is performed by using a filter called Gabor filter shown below and by a convolution between the filter and image in all pixels in the input image.

Hereinafter, there will be shown a Gabor filter G (x, y), x=0~gw−1, y=0~gh−1, in which gw and gh are filter sizes, which are the same as the signal unit embedded by the watermark information embedding device 10:

$$G(x, y) = \exp\left[-\pi\left\{\frac{(x-x0)^2}{A^2} + \frac{(y-y0)^2}{B^2}\right\}\right] \times \exp[-2\pi i\{u(x-x0) + v(y-y0)\}]$$

i: imaginary number unit $x=0\text{\textasciitilde}gw-1, y=0\text{\textasciitilde}gh-1, x0=gw/2, y0=gh/2$ A: effective width, B: effective height $\tan^{-1}$ (u/v): direction of wave, $\sqrt{u^2+v^2}$: frequency The filter output value at an arbitrary position in the input image is calculated by a convolution between the filter and image. In the case of Gabor filter, since there are a real number filter and an imaginary number filter (a filter with the phase thereof deviated from a real number filter by half-wavelength), the square mean value of them is set as a filter output value. For example, when the convolution between a luminance value in a certain pixel (x, y) and a real number filter in a filter A is Rc and the convolution between the luminance value and an imaginary number filter is Ic, a filter output value F (A, x, y) is calculated by the following expression.

$F(A,x,y)=\sqrt{Rc^2+Ic^2}$

Figure 13:
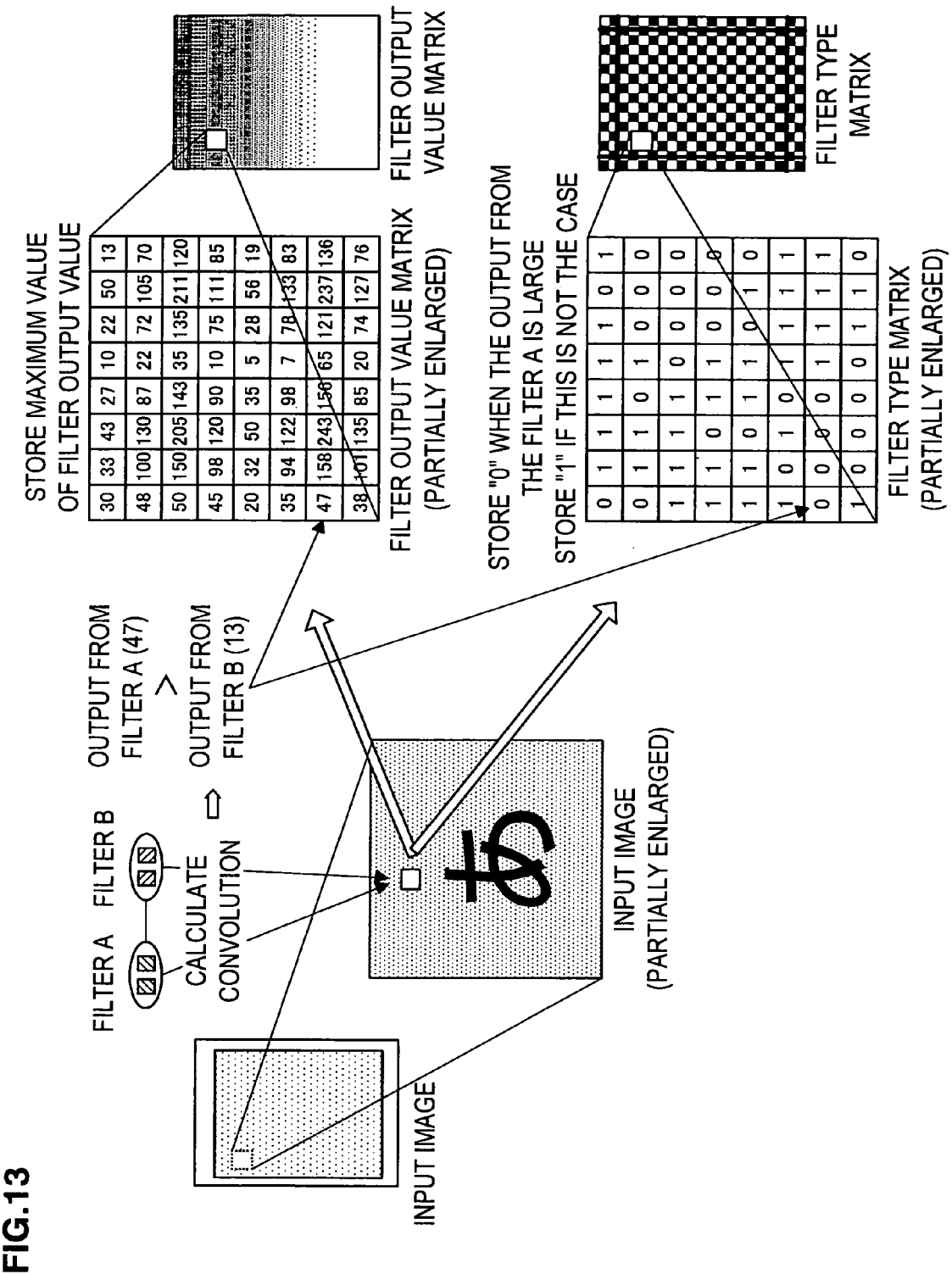
FIG. 13 is an explanatory diagram of a signal detection filtering step (step S310) in the first embodiment.

After calculating the filter output values for all filters corresponding to each signal unit as described above, the filter output values thus calculated are compared in each pixel, and the maximum value F (x, y) is stored as a filter output value matrix. Also, the number of the signal unit corresponding to a filter with the maximum value is stored as a filter type matrix (FIG. 13). More specifically, when there is expressed as F (A, x, y)>F (B, x, y) in a certain pixel (x, y), F (A, x, y) is set as the value (x, y) of filter output value matrix and "0" indicating a signal unit A is set as the value (x, y) of filter type matrix (in this embodiment, the numbers of A and B are set as "0" and "1", respectively).

Although the number of filters is two in this embodiment, it suffices if there are stored the maximum value of plural filter output values and the signal unit number corresponding to the filter at the time also when the number of filters is more than two.

<Signal Position Searching Step (step S320)>

In step S320, the signal unit position is determined by using the filter output value matrix obtained in step S310. More specifically, when the size of the signal unit is constituted by Sh×Sw, a signal position searching template is created (FIG. 14), in which the space of grid point in a vertical direction is Sh, the space in a horizontal direction is Sw and the number of grid points is expressed by Nh×Nw. The size of the template thus created becomes Th(Sh*Nh)×Tw(Sw*Nw), in which suitable values may be used for Nh and Nw so as to search the signal unit position.

Figure 14:
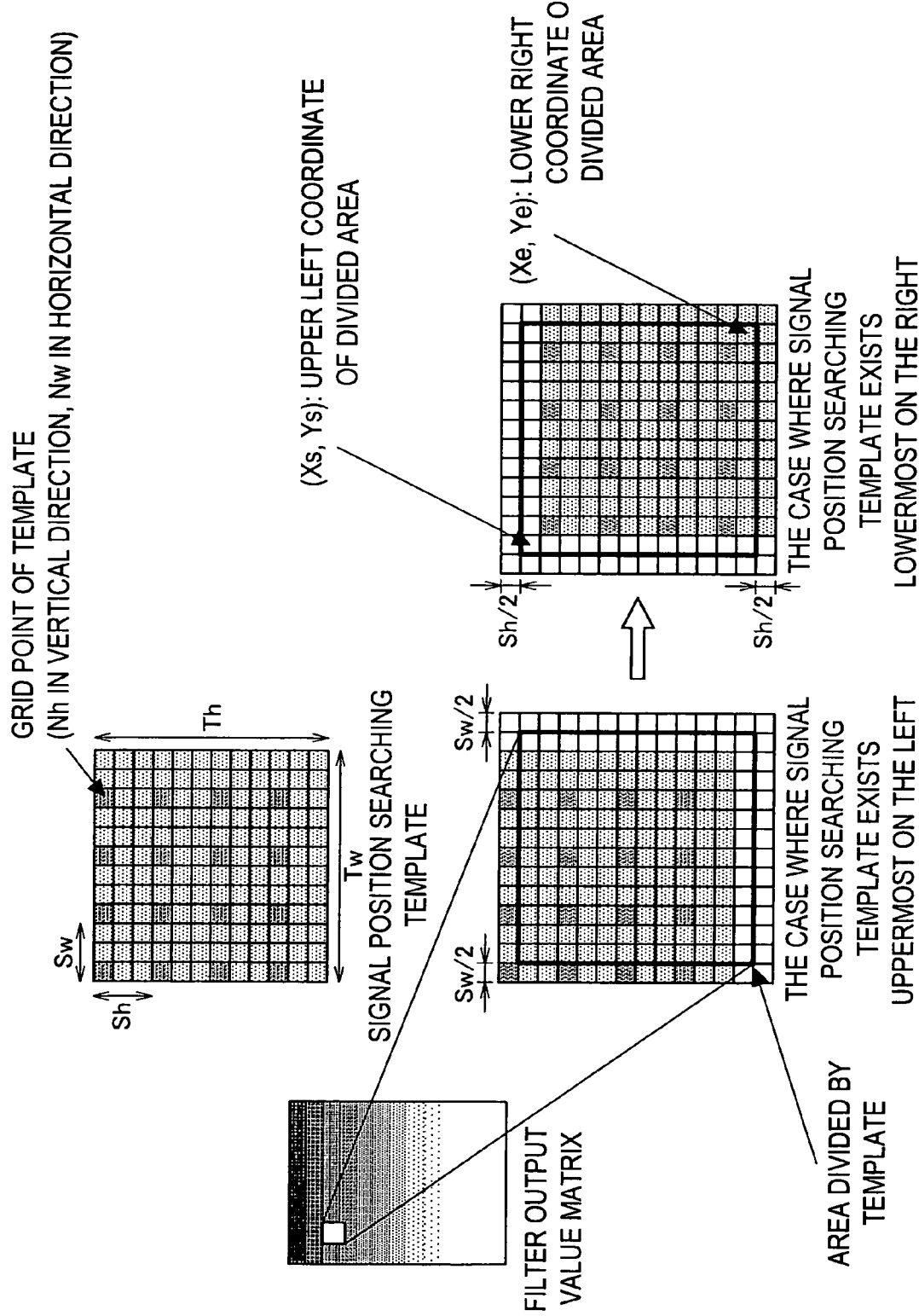
FIG. 14 is an explanatory diagram of a signal position searching step (step S320) in the first embodiment.

Next, the filter output value matrix is divided by the size of template. Further, in each divided area, moving the template in a unit of pixel on the filter output value matrix in a range not overlapping the signal unit in an adjacent area (horizontal direction ±Sw/2, vertical direction ±Sh/2), there is calculated a sum V of the filter output value matrix value F (x, y) on a template grid point by using the following expression (FIG. 14). The grid point of the template with the largest sum is set as the signal unit position of the area.

$$V(x, y) = \sum_{u=0}^{Nw-1} \sum_{v=0}^{Nh-1} F(x + Sw*u, y + Sh*v)$$

$Xs - Sw/2 < x < Xe + Sw/2, Ys - Sh/2 + < y < Ye + Sh/2$ (Xs,Ys): upper left coordinate of divided area, (Xe,Ye): lower right coordinate of divided area This example shows the case of calculating the filter output value for all pixels in step S310, in which filtering can be performed for only pixels spaced at a certain interval. For example, in the case of performing filtering every two pixels, the space of the grid points of the signal position searching template may be set at ½.

<Signal Symbol Determining Step (step S330)>

In step S330, the signal unit is determined A or B by referring to the value of the filter type matrix at the signal unit position determined in step S320 (signal unit number corresponding to the filter).

As above, the judgment result of the determined signal unit is stored as a symbol matrix.

<Signal Border Determining Step (step S340)>

In step S320, the filtering process is performed for the whole surface of the image whether the signal unit is embedded or not. Accordingly, it becomes necessary to determine where the signal unit is embedded. In step S340, the signal border is obtained by searching the pattern determined in advance when embedding the signal unit from the symbol matrix.

Figure 15:
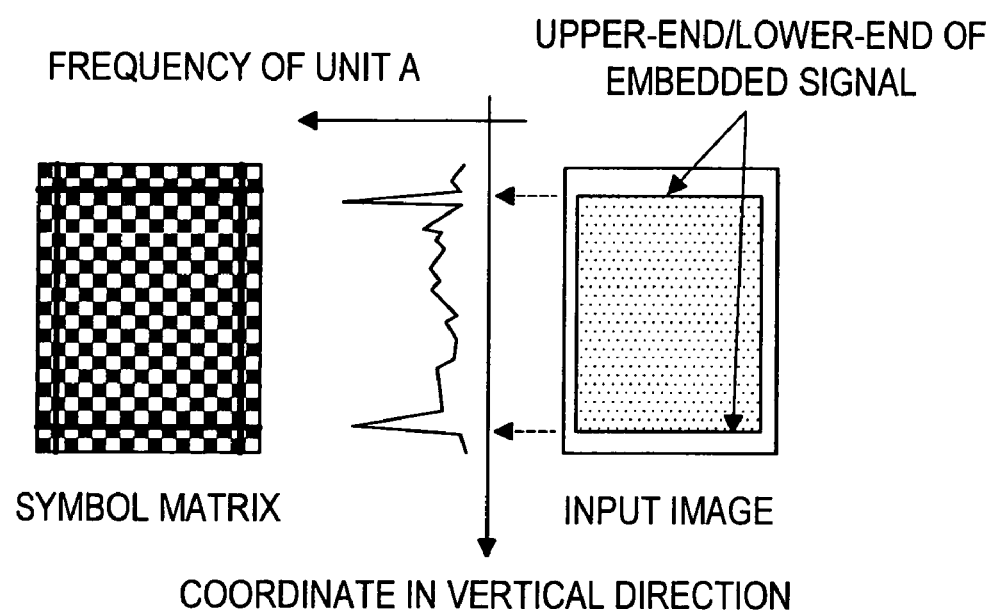
FIG. 15 is an explanatory diagram of a signal border determining step (step S340) in the first embodiment.

It is determined that, at the border where the signal unit is embedded, the signal unit A is embedded without fail. With this, the number of the signal units A is calculated in a horizontal direction of the symbol matrix determined in step S330, and the position with the largest number of the signal units A is determined as upper-end/lower-end of the signal border, going upward and downward from the central point. In the example of FIG. 15, since the signal unit A in the symbol matrix is expressed by "black" (value "0"), the number of the signal units A can be calculated by calculating the number of black pixels in the symbol matrix. According to the frequency distribution thereof, the upper-end/lower-end of the signal border can be obtained. The leftmost/rightmost, which is different in the direction of calculation of the number of the units A, can be obtained similarly.

The method of obtaining the signal border is not restricted to the above method, and it suffices if the pattern that can be searched from the symbol matrix is determined in advance on the sides of embedding and detecting.

Getting back to the flowchart of FIG. 12, the following step S305 will be described. In step S305, the original information is restored from the part corresponding to the internal part of the signal border in the symbol matrix. In this embodiment, since one unit pattern is configured by one symbol unit, the unit pattern matrix becomes equivalent to the symbol matrix.

<Information Decoding Step (step S305)>

Figure 16:
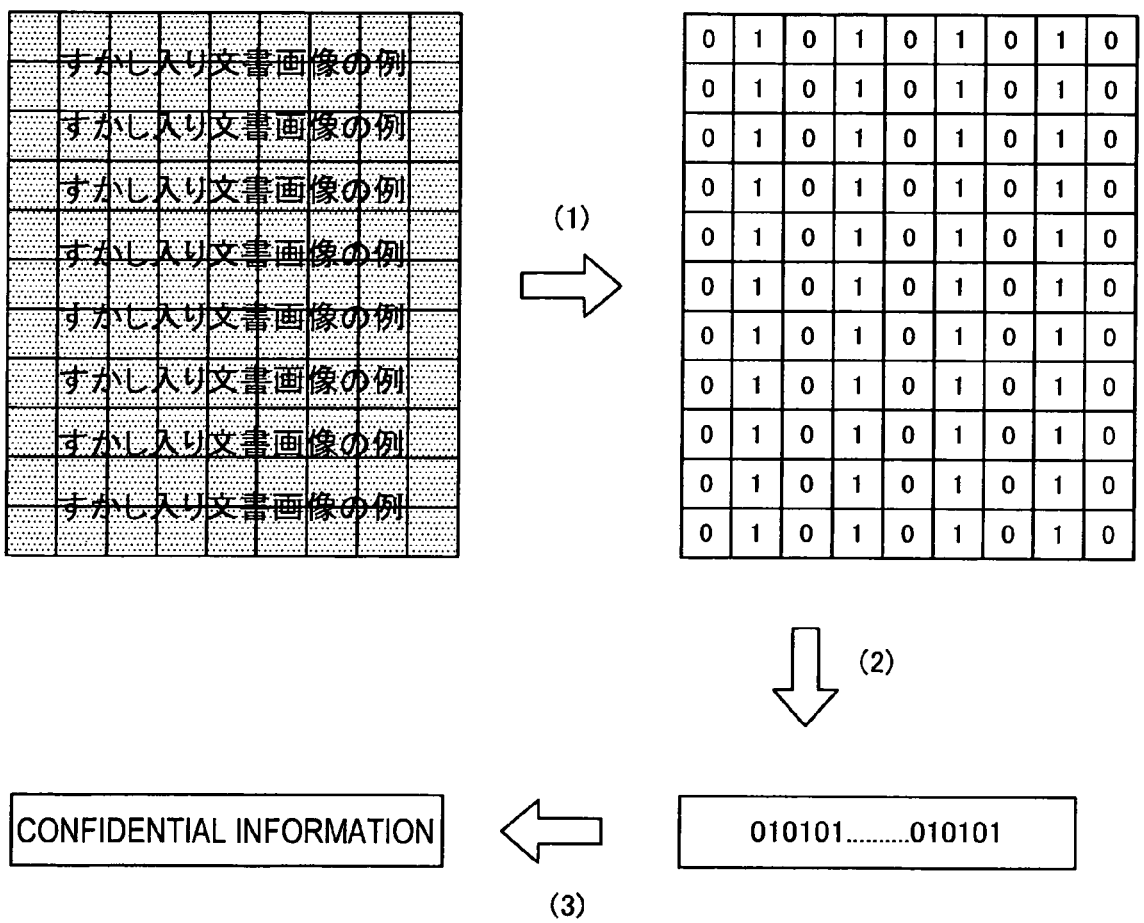
FIG. 16 is an explanatory diagram showing an example of information restoring step (step S305) in the first embodiment.

FIG. 16 is an explanatory diagram showing an example of information restoring. The step of restoring information is as follows.

(1) The symbols embedded in each unit pattern are detected (FIG. 16(1)).

(2) The data code is restored by coupling symbols (FIG. 16 (2)).

(3) The embedded information is retrieved by decoding the data code (FIG. 16 (3)).

Figure 17:
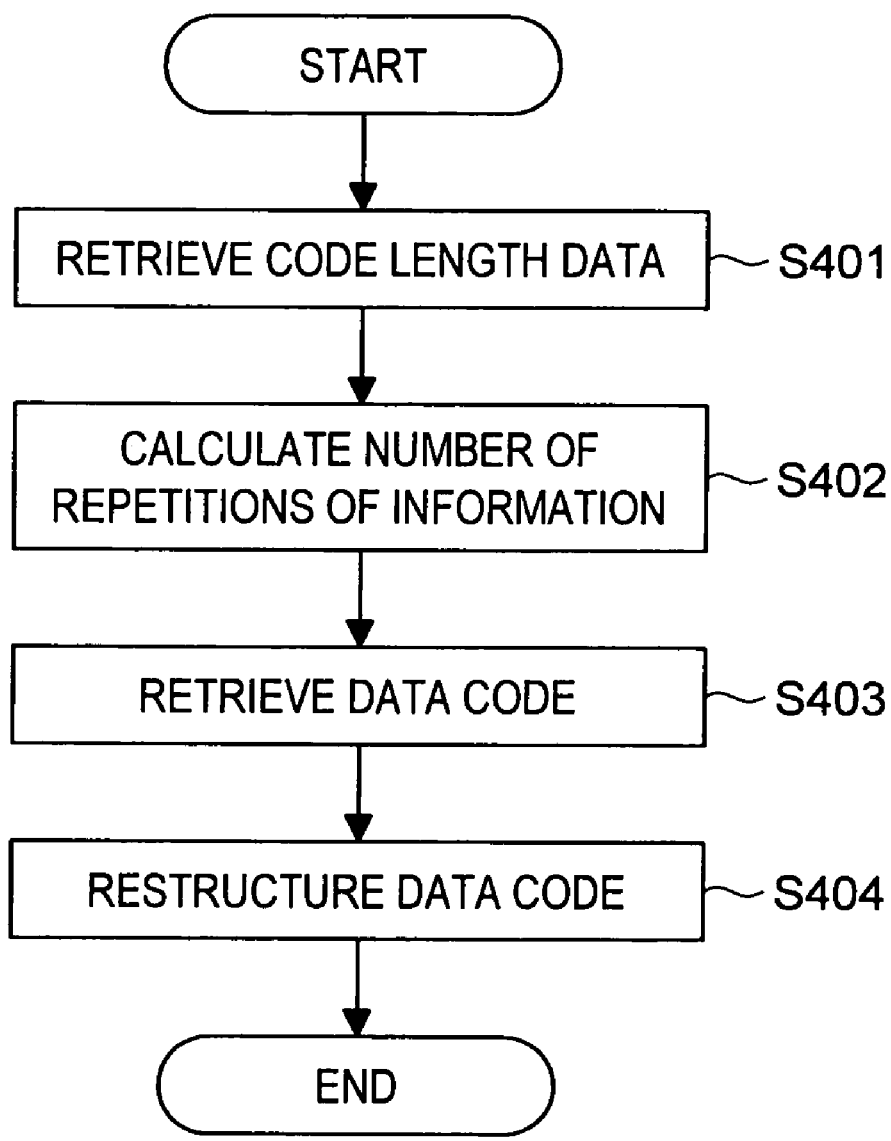
FIG. 17 is an explanatory diagram showing a flow of process of a method of restoring a data code.
Figure 18:
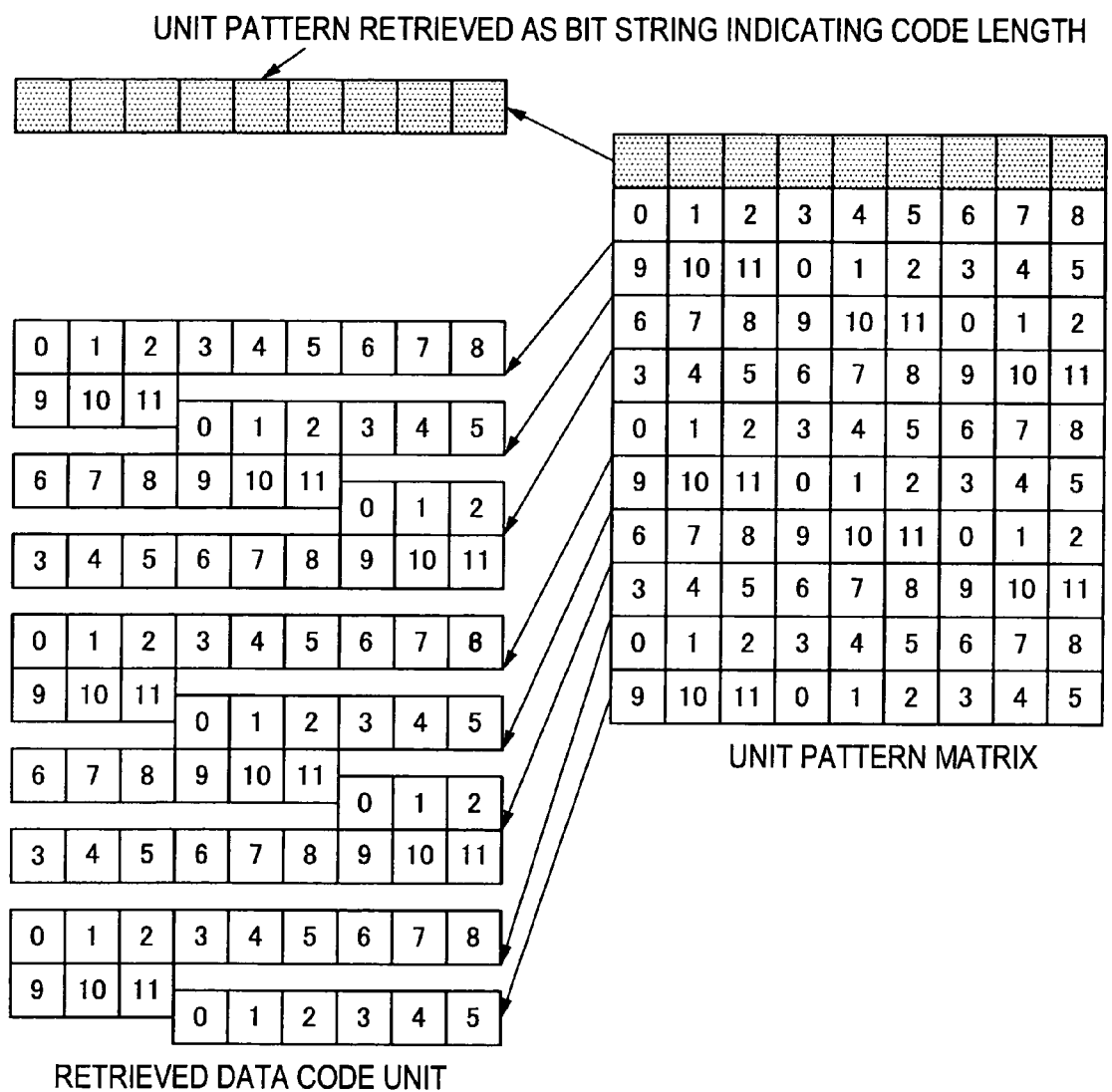
FIG. 18 is an explanatory diagram showing an example of a method of restoring a data code.
Figure 19:
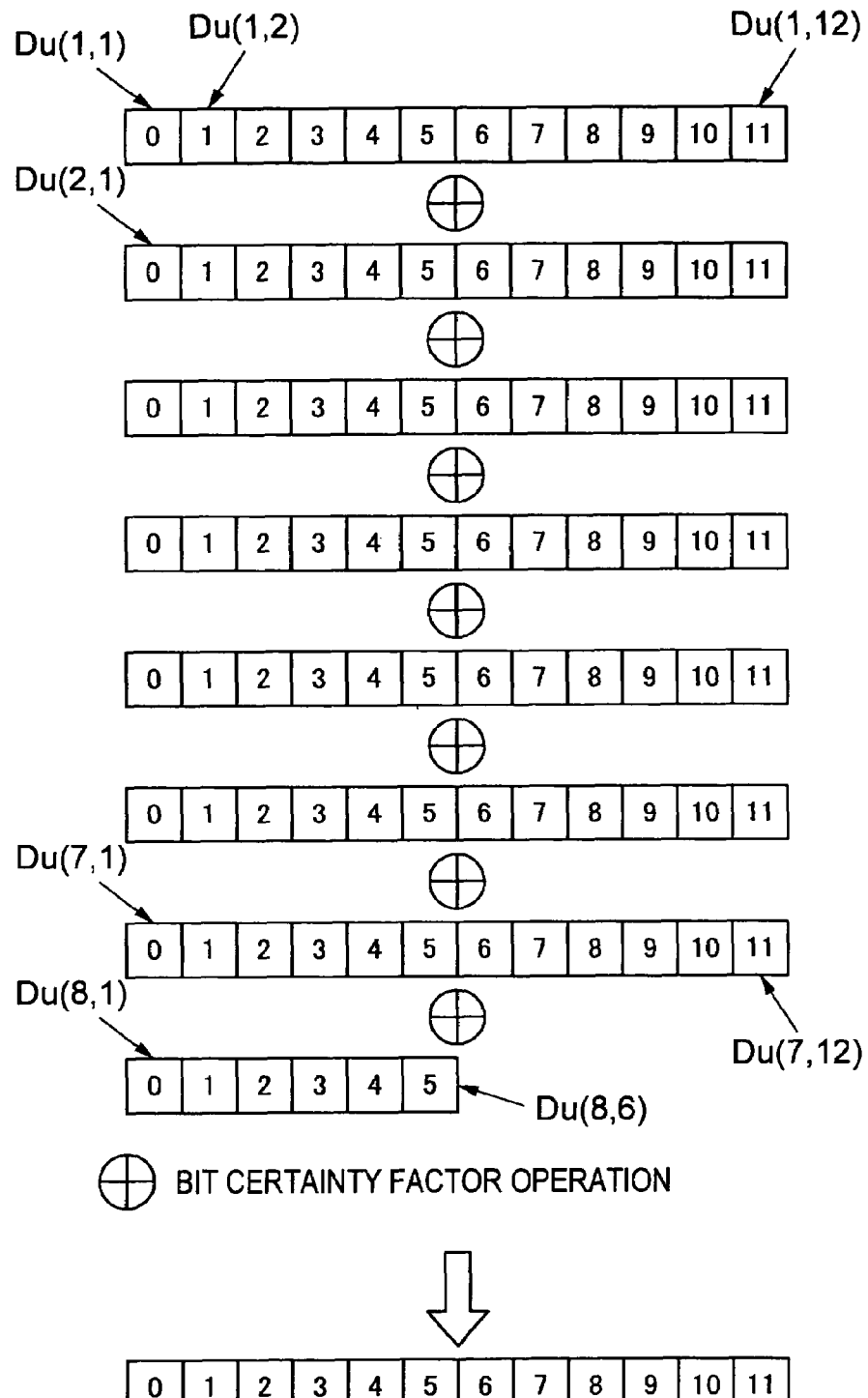
FIG. 19 is an explanatory diagram showing an example of a method of restoring a data code.

FIGS. 17 to 19 are explanatory diagrams showing an example of a method of restoring a data code. The restoring method is an inverse process of FIG. 8 basically.

First, the part of the code length data is retrieved from the first row of the unit pattern matrix to obtain the data length of the data code embedded (step S401).

Next, the number Dn of embedding the data code unit and the residue Rn are calculated based on the size of the unit pattern matrix and the code length of the data code obtained in step S401 (step S402).

Next, the data code unit is retrieved with the inverse method in step S203 from the second row and the followings of the unit pattern matrix (step S403). In the example of FIG. 18, there is resolved by twelve pattern units (U (1, 2)~U (3, 3), U (4, 3)~U (6, 4), . . . ) from U (1, 2) (second row and first column). In the case of Dn=7 and Rn=6, the twelve pattern units (data code unit) are retrieved seven times and six (upper six data code units) unit patterns (U (4, 11)~U (9, 11)) are retrieved as residues.

Next, performing a bit certainty factor operation for the data code unit retrieved in step S403, the embedded data code is restructured (step S404). Hereinafter, the bit certainty factor operation will be described.

The data code units retrieved first from the second row and first column of the unit pattern matrix are set as Du (1, 1)~Du (12, 1), and as Du (1, 2)~Du (12, 2), . . . , sequentially as shown in FIG. 19. The residue parts are set as Du (1, 8)~Du (6, 8). In the bit certainty factor operation, the value of each symbol of the data code is determined by deciding by majority for each element of the data code unit, or with other methods. Thereby even when the signal cannot be detected correctly from an arbitrary unit in an arbitrary data code unit (bit inversion error, etc.) due to overlapping with a character area or dirt on paper, the data code can be restored correctly eventually.

More specifically, the first bit of the data code is judged to be "1" when there are more cases where the signal detection results in Du (1, 1), Du (1, 2), . . . , Du (1, 8) fall into the case of "1". The first bit of the data code is judged to be "0" when there are more cases where the signal detection results therein fall into the case of "0". Similarly, the second bit of the data code is judged by deciding by majority according to the signal detection results in Du (2, 1), Du (2, 2), . . . , Du (2, 8) while the twelfth bit of the data code is judged by deciding by majority according to the signal detection results in Du (12, 1), Du (12, 2), . . . , Du (12, 7), in which Du (12, 8) does not exist.

Here, although there has been described the case of embedding the data code repeatedly, it is possible to realize such a method of not performing the repetition of the data code unit by using an error-correcting code, etc. in coding data.

ADVANTAGE OF FIRST EMBODIMENT

According to this embodiment, as described above, performing filtering process on the whole surface of the input image and using the signal position searching template make it possible to obtain the signal unit position so as for the sum of the filter output value to be maximum. Accordingly, even when the image is expanded or contracted due to displacement of paper, etc., the signal unit position can be correctly detected and confidential information can be correctly detected from a document including confidential information.

SECOND EMBODIMENT

In the first embodiment described above, the signal position is searched in each divided area in which the filter output value matrix is divided by the size of the signal position searching template. In the second embodiment, on the other hand, the position at which the signal position is searched by the signal position searching template is initially set at such a position at which the signal position can be obtained as the center of paper, when searching the signal position. Then the signal position is searched at the initial position and when the signal position can be determined, the peripheral signal positions are sequentially determined based on the determined signal position.

Since the configurations of a watermark information embedding device 10 and a watermark information detecting device 30 in this embodiment are substantially the same as in the first embodiment, the overlapped description thereof will be omitted. Hereinafter, the operation in this embodiment will be described.

Figure 20:
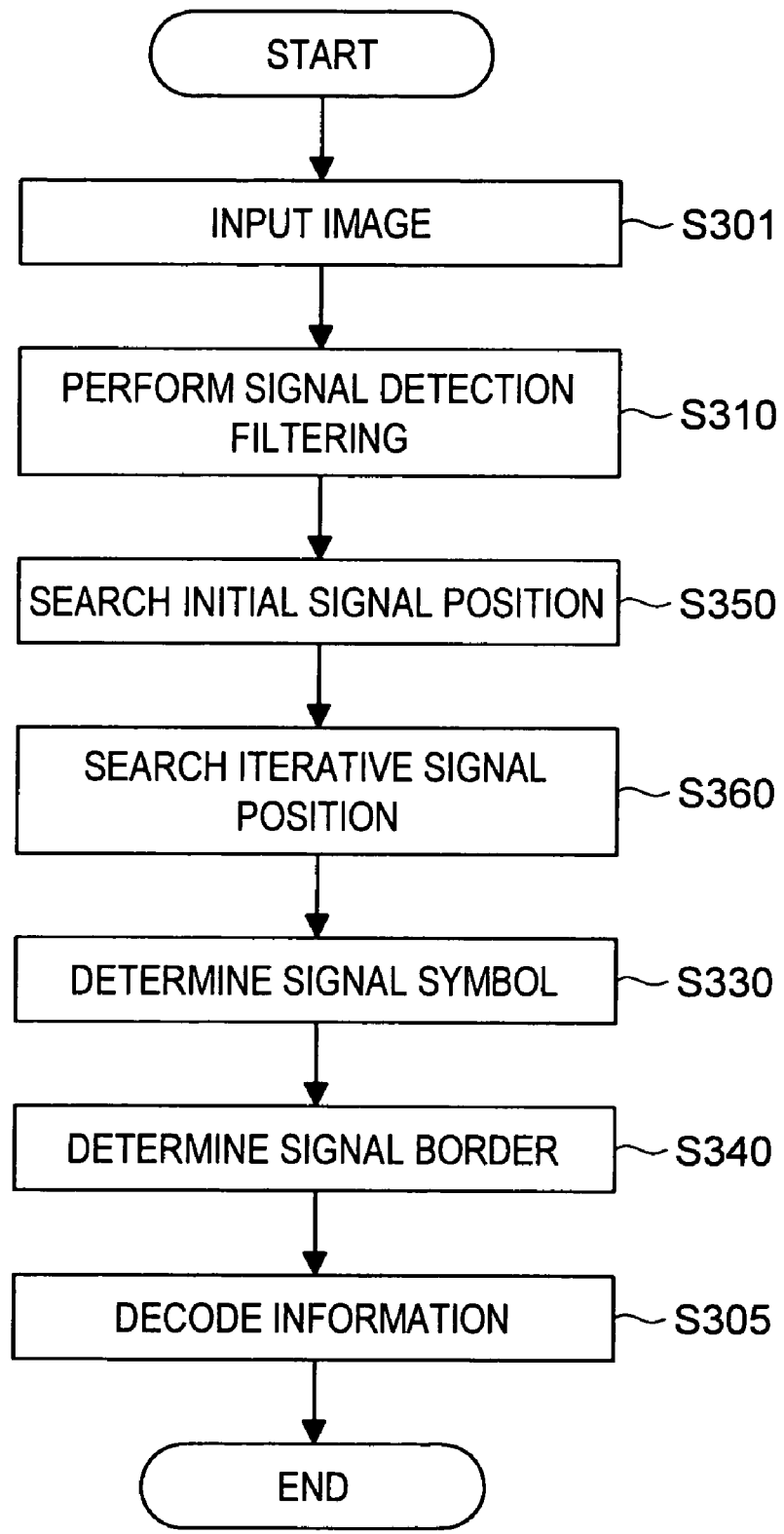
FIG. 20 is a flowchart showing a flow of process of a watermark detecting part 32 in a second embodiment.

FIG. 20 shows a flowchart in the second embodiment. A signal position searching step (step S320) in the first embodiment is replaced by an initial signal position searching step (step S350) and an iterative signal searching step (step S360). Hereinafter, only different points will be described.

<Initial Signal Position Searching Step (step S350)>

In step S350, the initial position of the signal position searching template is determined. The initial position to be determined is set at the position at which the signal unit can be detected with high accuracy. For example, the central position of the input image, or the position with most nondense distribution of a comparatively dark pixel corresponding to character (a pixel with small luminance value) so as to avoid the area including the character of the input image, are applicable.

<Iterative Signal Searching Step (step S360)>

Figure 21:
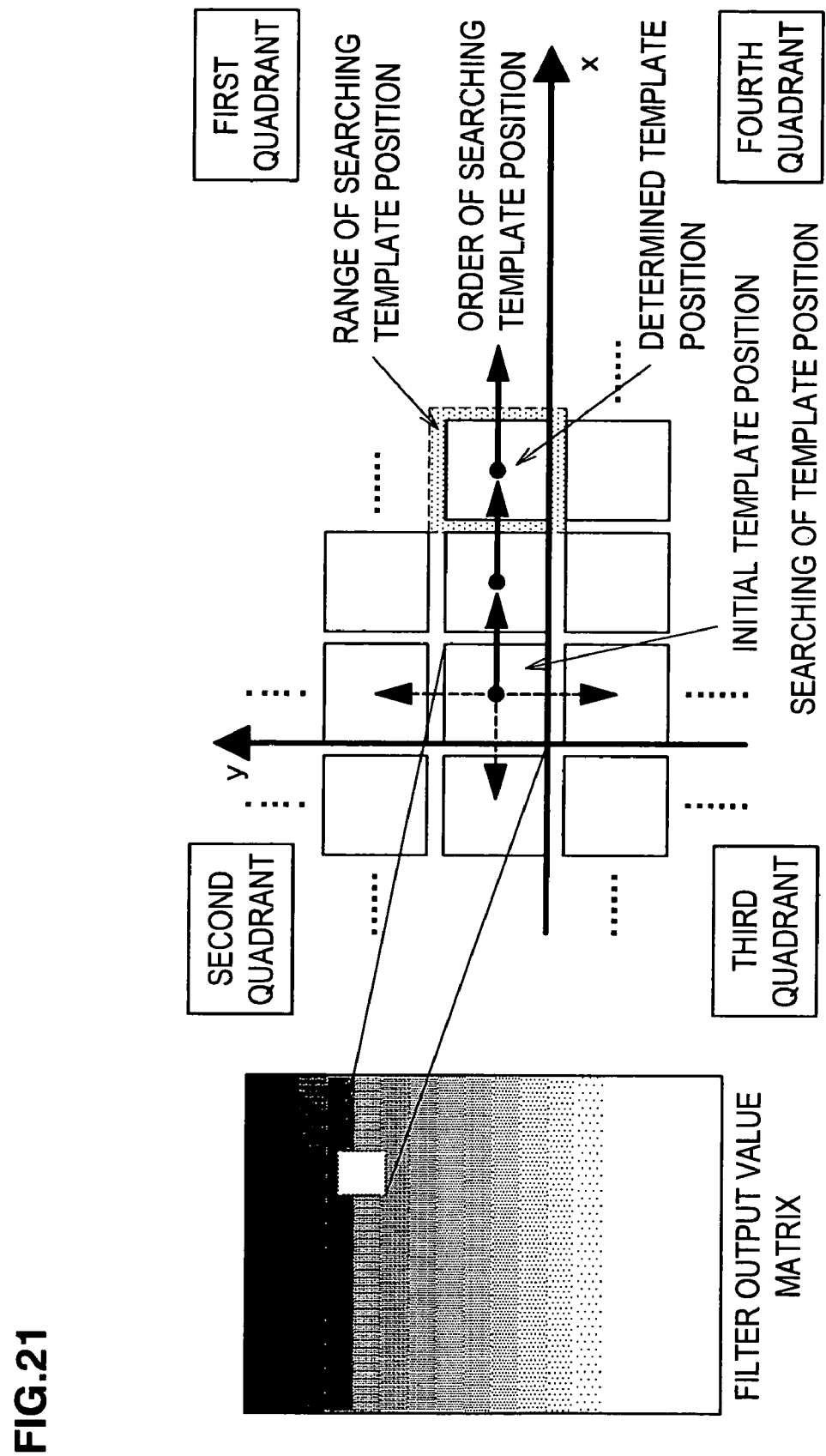
FIG. 21 is an explanatory diagram of an iterative signal position searching step (step S360) in the second embodiment.

In step S360, setting the initial position of the signal position searching template determined in step S350 as a base point, the positions of the adjacent templates are sequentially determined. One position of the template is determined in the initial position with the same method as the signal position searching step (step S320) in the first embodiment. Next, the adjacent areas on the top and bottom or the left and right of the determined template are set as the next template searching position to search the next template position. Similar processes are repeated to determine the template positions on the whole of the input image (FIG. 21). With regard the order of the adjacent template position, there is searched in the first quadrant, for example, to the end of the image in a positive direction on an x-axis and then proceeds in a positive direction on a y-axis by one area to be searched in a positive direction on an x-axis. Next, there can be searched in the second, third and fourth quadrants, in which the searching directions are different.

ADVANTAGE OF SECOND EMBODIMENT

According to this embodiment, as described above, the next template can be searched from the adjacent position to a certain signal position searching template. Even in the case of including a displacement with larger size than the signal unit with regard to the initial position, such as the case of accumulating a displacement toward the edge of the image due to rotation of image, the signal unit can be properly detected.

THIRD EMBODIMENT

In the first embodiment, the filter output value matrix is divided by the size of the signal position searching template and the signal position is searched by referring only to the filter output value inside the signal position searching template. In the third embodiment, on the other hand, the signal position is searched by creating an expanded template including the signal position searching template and having the size larger than the signal position searching template and by using the expanded template capable of referring also to the filter output value existing around the divided area.

Since the configurations of a watermark information embedding device 10 and a watermark information detecting device 30 in this embodiment are substantially the same as in the first embodiment, the overlapped description thereof will be omitted. Hereinafter, the operation in this embodiment will be described.

Figure 22:
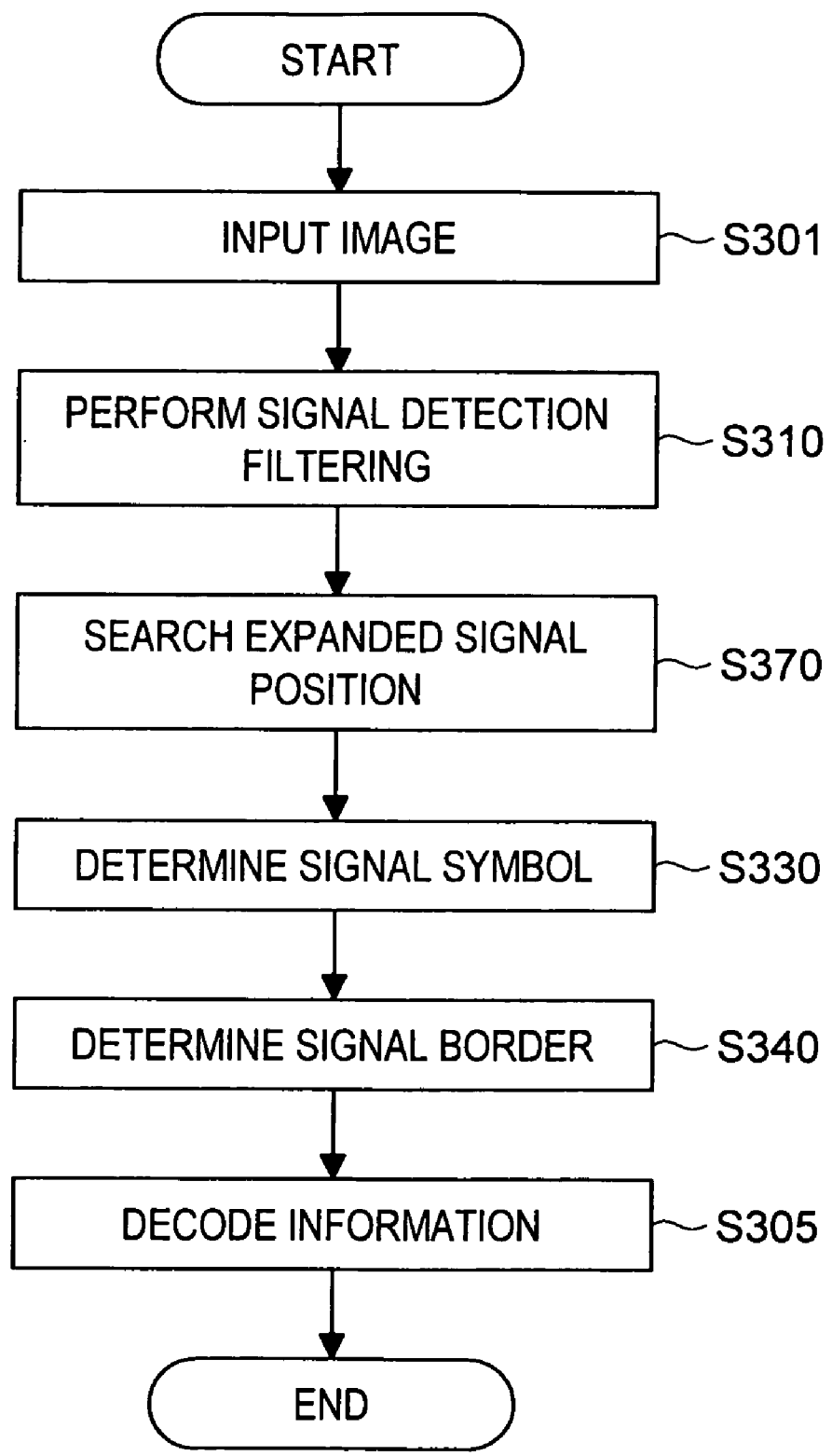
FIG. 22 is a flowchart showing a flow of process of a watermark detecting part 32 in a third embodiment.

FIG. 22 shows a flowchart in the third embodiment. A signal position searching step (step S320) in the first embodiment is replaced by an expanded signal position searching step (step S370). Hereinafter, only different points will be described.

<Expanded Signal Position Searching Step (step S370)>

Figure 23:
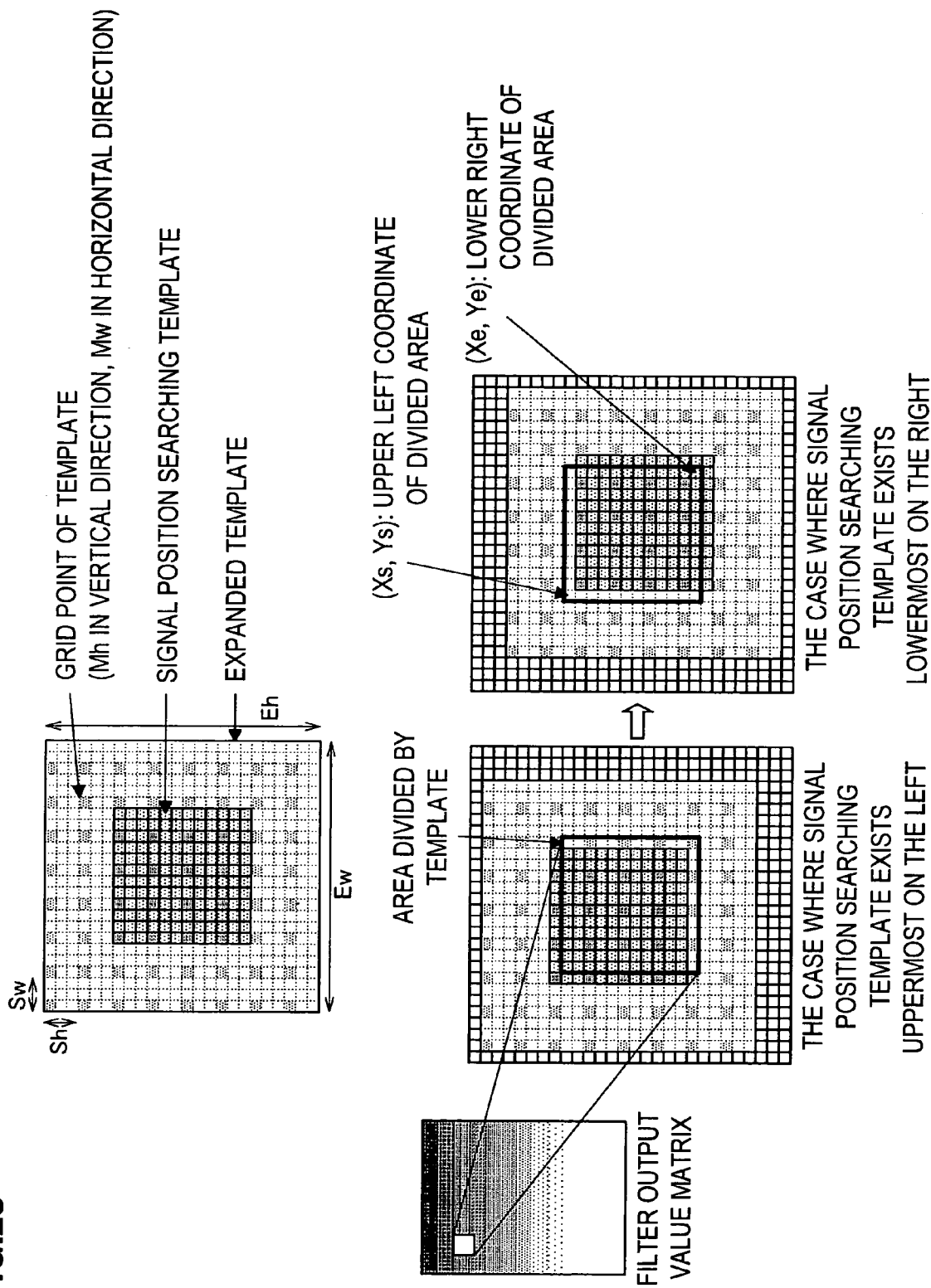
FIG. 23 is an explanatory diagram of an expanded signal position searching step (step S370) in the third embodiment.

In step S370, the signal position searching template is created with the same method as the signal position searching step (step S320) in the first embodiment and a larger expanded template is created to arrange the signal position searching template inside it (FIG. 23). The expanded template has the same grid points as those in the signal position searching template, and the number of the grid points is determined by Mh×Mw (Mh≧Nh, Mw≧Nw). The size of the created expanded template is determined by Eh(Sh*Mh)×Ew (Sw*Mw). The inside signal position searching template is arranged at the center and the filter output value matrix is divided into the size of the signal position searching template as in the signal position searching step (step S320).

Further, moving the expanded template in a unit of pixel within a range in order for the inside signal position searching template not to be overlapped with the signal unit of the adjacent area, and calculating a sum W of the filter output value matrix value F (x, y) on the grid points, the position of the expanded template with the largest value of the sum W is determined. From the determined expanded template, the position of the inside signal position searching template is determined and the grid point is set as the signal unit position of the divided area.

$$W(x, y) = \sum_{u=-u0}^{u1} \sum_{v=-v0}^{v1} F(x + Sw*u, y + Sh*v)$$

$$Mh = v1 + v0 + 1, Mw = u1 - u0 + 1$$

(u0, v0): coordinate of upper left grid point of signal position determining template in the case of setting upper left grid point of expanded template as origin $$Xs-Sw/2<x<Xe+Sw/2, Ys-Sh/2+\leq y \leq Ye+Sh/2$$

(Xs,Ys): upper left coordinate of divided area, (Xe,Ye): lower right coordinate of divided area

ADVANTAGE OF THE THIRD EMBODIMENT

According to this embodiment, as described above, the signal position can be identified by using the filter output value in the neighborhood area as well as the filter output value in the divided area. Even when the filter output value in the divided area cannot be obtained such as the case of including a character area of the input image in the divided area, the signal can be properly detected.

FOURTH EMBODIMENT

In the first embodiment, the signal border is obtained by determining the signal unit position by using the signal position searching template and by the symbol matrix obtained thereafter. In the fourth embodiment, on the other hand, embedding the number of signal units in horizontal/vertical directions as well as the confidential information at the same time in advance and determining the signal unit position and the signal border, the above information embedded is detected as required and the signal unit position according to the information.

Since the configurations of a watermark information embedding device 10 and a watermark information detecting device 30 in this embodiment are substantially the same as in the first embodiment, the overlapped description thereof will be omitted. Hereinafter, the operation in this embodiment will be described.

Figure 24:
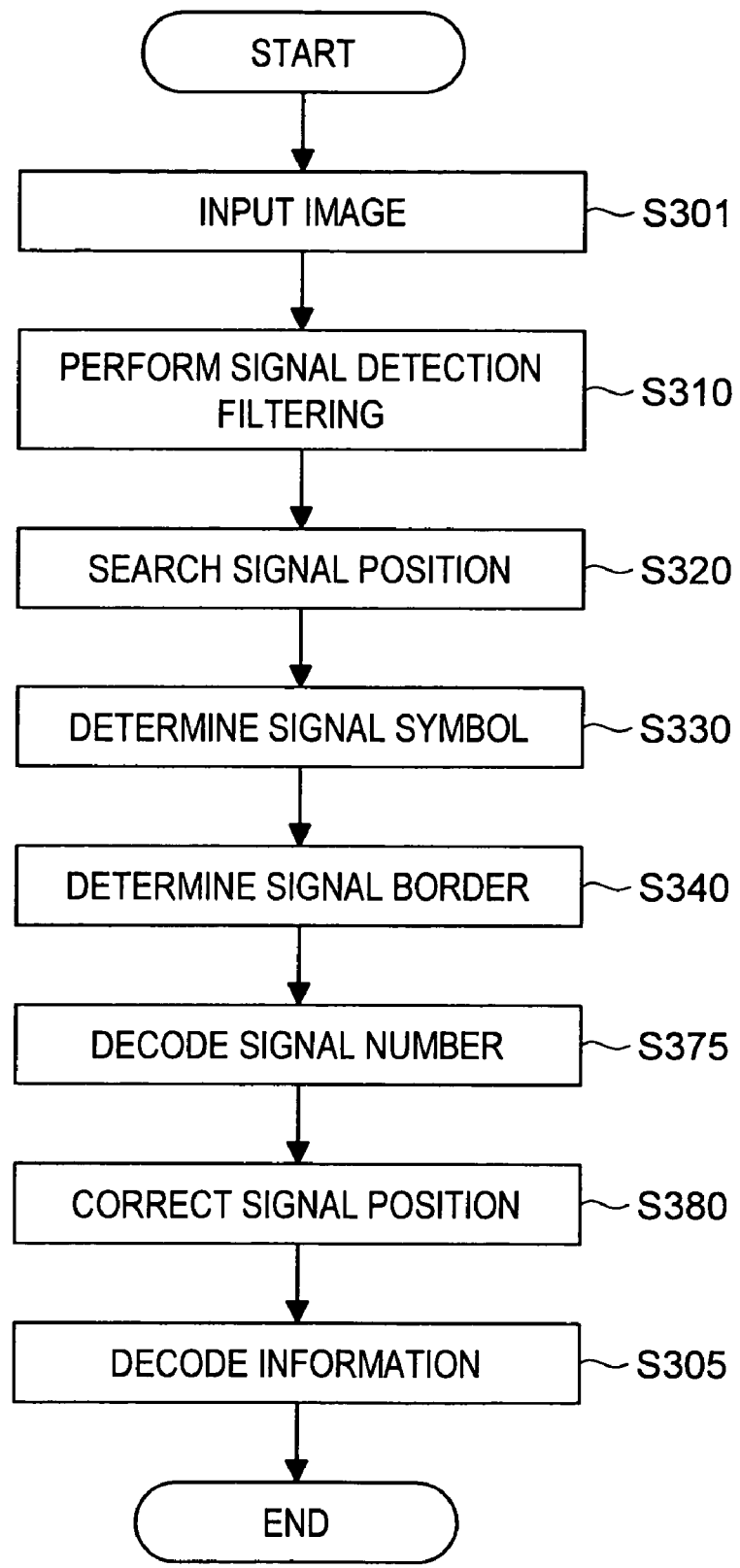
FIG. 24 is a flowchart showing a flow of process of a watermark detecting part 32 in a fourth embodiment.

FIG. 24 shows a flowchart in the fourth embodiment. A signal number decoding step (step S375) and a signal position correcting step (step S380) are added to the first embodiment. Hereinafter, a method of correcting the signal unit position will be described.

<Signal Number Decoding Step (step S375)>

In step S375, as in the information decoding step (step S305) in the first embodiment, information is decoded based on the signal border determined in the signal position searching step (step S320) and the signal border determining step (step S340), to detect the number of signal units in horizontal/vertical directions as well as the confidential information that are embedded in advance, from the decoded data. The place where the information is embedded may be wherever detectable reliably such as directly inside the signal border capable of detecting stably. Further in coding/decoding, it is only necessary to embed by coding using an arbitrary method such as using an error-correcting code and by using the signal unit assigned to each symbol.

<Signal Position Correcting Step (step S380)>

Figure 25:
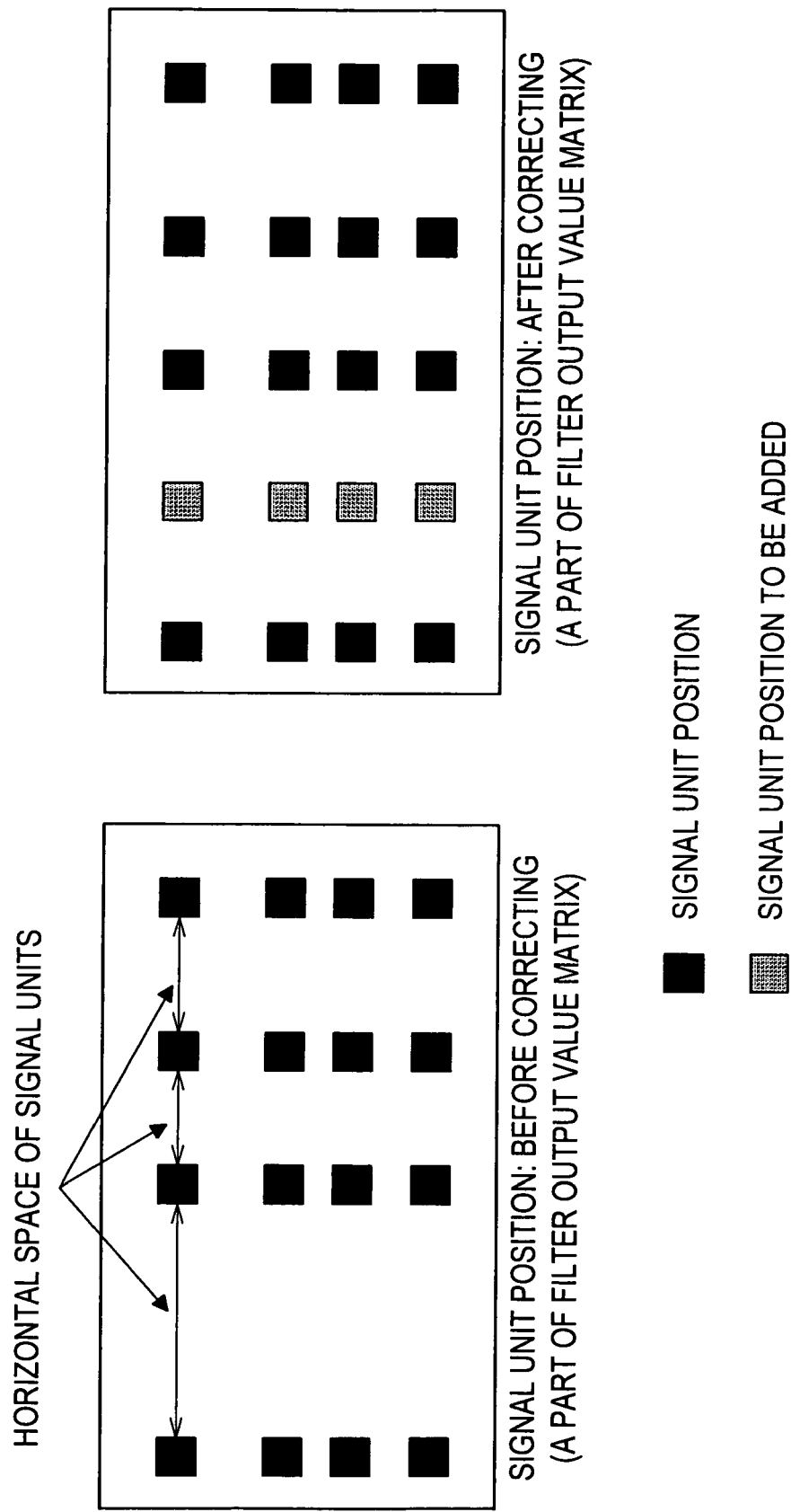
FIG. 25 is an explanatory diagram of a signal position correcting step (step S380) in the fourth embodiment.

FIG. 25 is an explanatory diagram of a process of correcting signal position.

In step S380, the number of signal units in horizontal/vertical directions is obtained based on the signal border determined in the signal position searching step (step S320) and the signal border determining step (step S340). Then comparing with the number of signal units detected in step S375, the signal unit position is corrected in the case of not matching.

As the correcting method, when the number in the horizontal direction is smaller comparing with the information embedded, the space between the signal unit positions detected in each horizontal direction as in FIG. 25 and a new signal unit position is added in the midpoint of the largest space between the signal unit positions. When the number of the signal units corrected by adding the signal unit position is smaller than the number of the extracted signal units as this case, the above process is repeated until being equal to the number of the detected signal units. In the case of being larger, on the other hand, one signal unit position is deleted sequentially from the minimum space in the horizontal direction of the signal unit position. The signal unit position can be corrected also in the vertical direction as in the horizontal direction.

ADVANTAGE OF FOURTH EMBODIMENT

According to this embodiment, as described above, detecting the number of the signal units embedded in advance and referring to the information make it possible to correct the signal unit position even when the signal unit position has been wrongly searched by the template, and the signal unit position can be detected more correctly. As a result, confidential information can be correctly detected from a document including confidential information.

FIFTH EMBODIMENT

In the first embodiment as described above, only the detection of confidential information from the printed document is performed. In the fifth embodiment, on the other hand, adding an alteration judging part to the first embodiment, using the signal unit position obtained in the signal position searching step (step S320) and comparing the feature quantity of document image (image data before embedding watermark) in each signal unit position with the feature quantity of input image (image in which a printed document with watermark embedded is read by a scanner, etc.), it is judged whether the contents of the printed document are altered or not.

Figure 26:
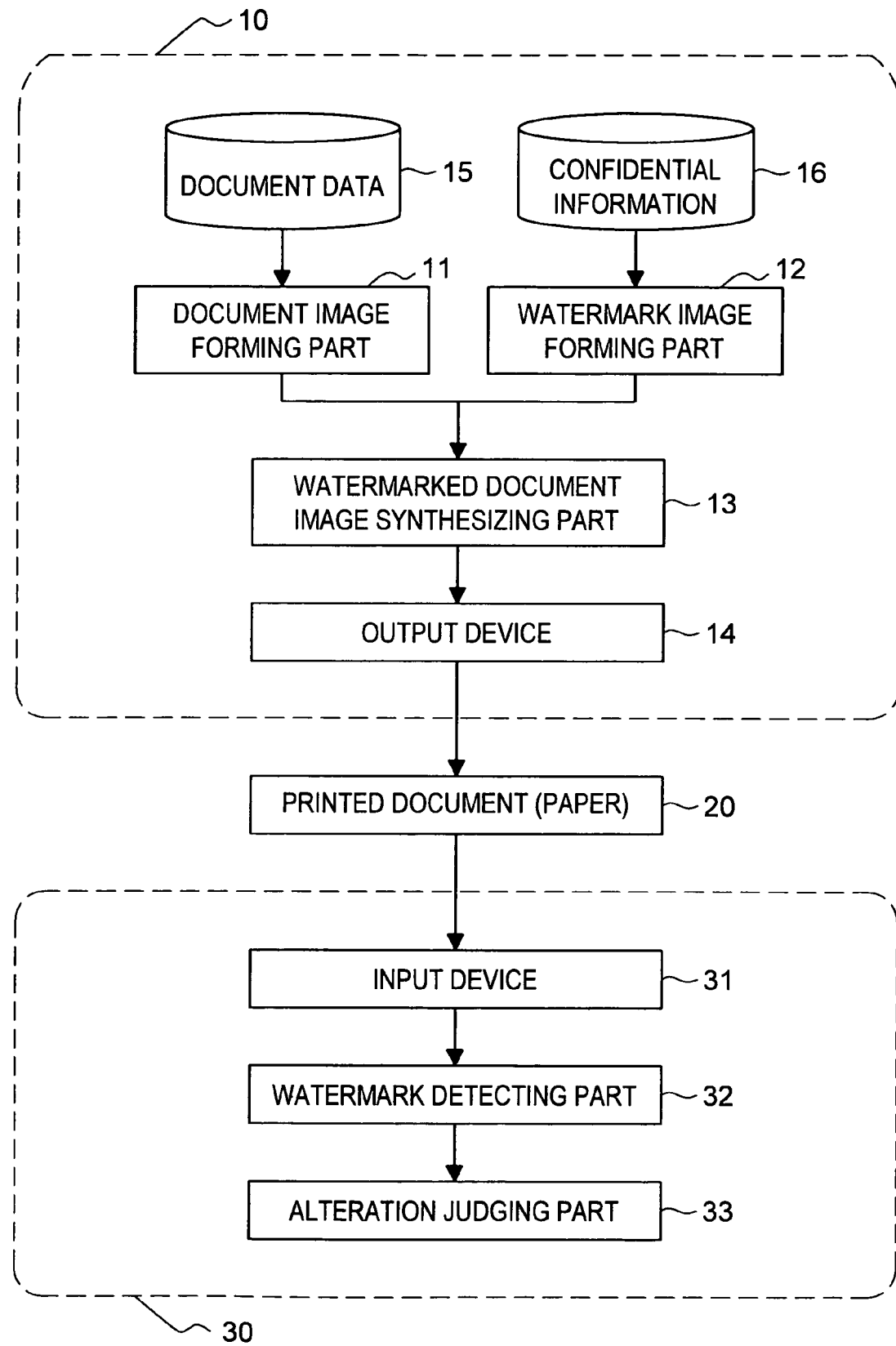
FIG. 26 is an explanatory diagram showing configurations of a watermark information embedding device and a watermark information detecting device in a fifth embodiment.

FIG. 26 is a diagram showing a processing configuration in the fifth embodiment, in which an alteration judging part 33 is added to the first embodiment. The alteration judging part 33 judges the alteration of the contents of printed document by comparing the feature quantity of the document image embedded in advance with the feature quantity of the input image.

Figure 27:
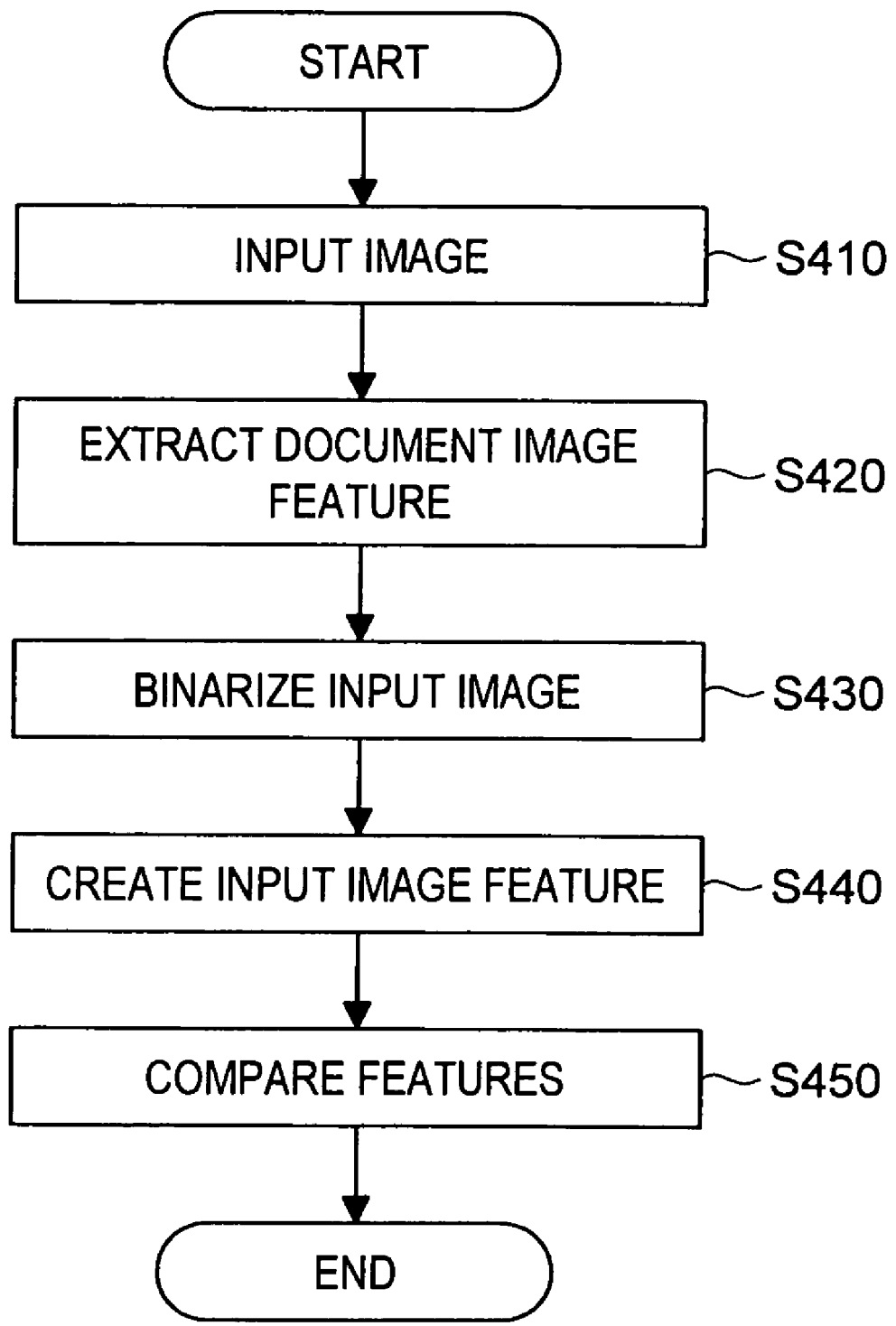
FIG. 27 is a flowchart showing a flow of process of an alteration judging part 33.

FIG. 27 shows a flow of process of the alteration judging part 33.

Figure 28:
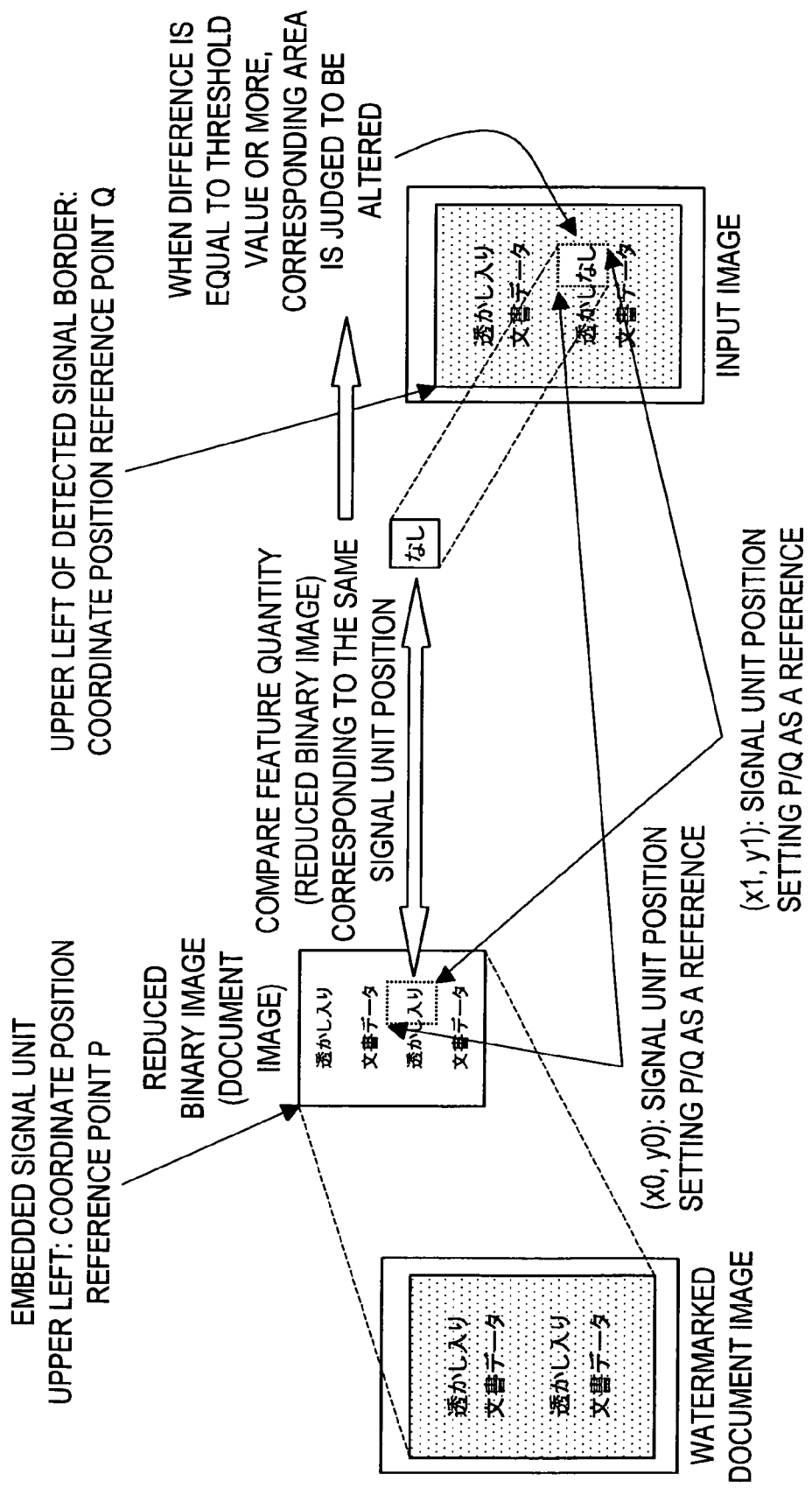
FIG. 28 is an explanatory diagram of a feature comparing step (step S450).

FIG. 28 is an explanatory diagram of a process of the alteration judging part 33.

In step S410, the watermarked document image embedded by an input device 31 such as scanner is input to a memory, etc. of a computer similarly to the first embodiment (this image is called an input image).

<Document Image Feature Quantity Extracting Step (step S420)>

In step S420, the feature quantity of the document image embedded in advance is extracted from the data decoded in the information decoding step (step S305) in the watermark detecting part 32. As the document image feature quantity in this embodiment, a reduced binary image is used in which the upper left coordinate of the area with the signal unit embedded is set as a reference point (a reference point P in FIG. 28) in the watermarked document image as in FIG. 28. Since the document image on the embedding side is a binary image, it is only necessary to perform a reducing process using a well-known technology. The image data may be embedded by using the signal unit assigned to each symbol after compressing a data quantity using a compression method for a binary image such as MR and MMR.

<Input Image Binarizing Processing Step (step S430)>

In step S430, the input image is binarized. In this embodiment, the information on a binary threshold embedded in advance is extracted from the data decoded in the information decoding step (step S305) in the watermark detecting part 32. Determining the binary threshold from the extracted information, the input image is binarized. The information on the binary threshold only has to be embedded by coding with an arbitrary method such as using an error-correcting code and by using the signal unit assigned to each symbol, as in the case of the number of signal units in the fourth embodiment.

An example of the information on the binary threshold is the number of black pixels included in the document image when embedding. In such a case, it is only necessary to set the binary threshold so that the number of black pixels of the binary image obtained by binarizing the input image normalized to have the same size as the document image may match the number of black pixels included in the document image when embedding.

Further, dividing the document image into some areas and embedding the information on the binary threshold in each area make it possible to binarize per area of the input image. Thereby even when a certain area in the input image is largely altered and the number of black pixels is different from the number of the black pixels in the original document image, going beyond an area of correct binary threshold, a correct binary threshold can be set by referring to the information on the binary threshold of the neighborhood area.

With regard to binarizing an image, an image may be binarized by determining a binary threshold by using a well-known technology. However, adopting the above method makes it possible to create almost the same data also on the side of detecting watermark as the binary image of a document image when embedding.

<Input Image Feature Quantity Creating Step (step S440)>

In step S440, the feature quantity of the input image is created from the input image, the signal unit position obtained in the signal position searching step (step S320) and the signal border obtained in the signal border determining step (step S340). More specifically, setting the upper left coordinate of the signal border as a reference point (a reference point Q in FIG. 28) and dividing plural signal units as one unit, the reduced image of input image to which the coordinate position corresponds in the unit. In FIG. 28, there is indicated as an example of a certain area divided as above a rectangle with the upper left coordinate (xs, ys) and the lower right coordinate (xe, ye). A reducing method may be the same method on the embedding side.

Figure 29:
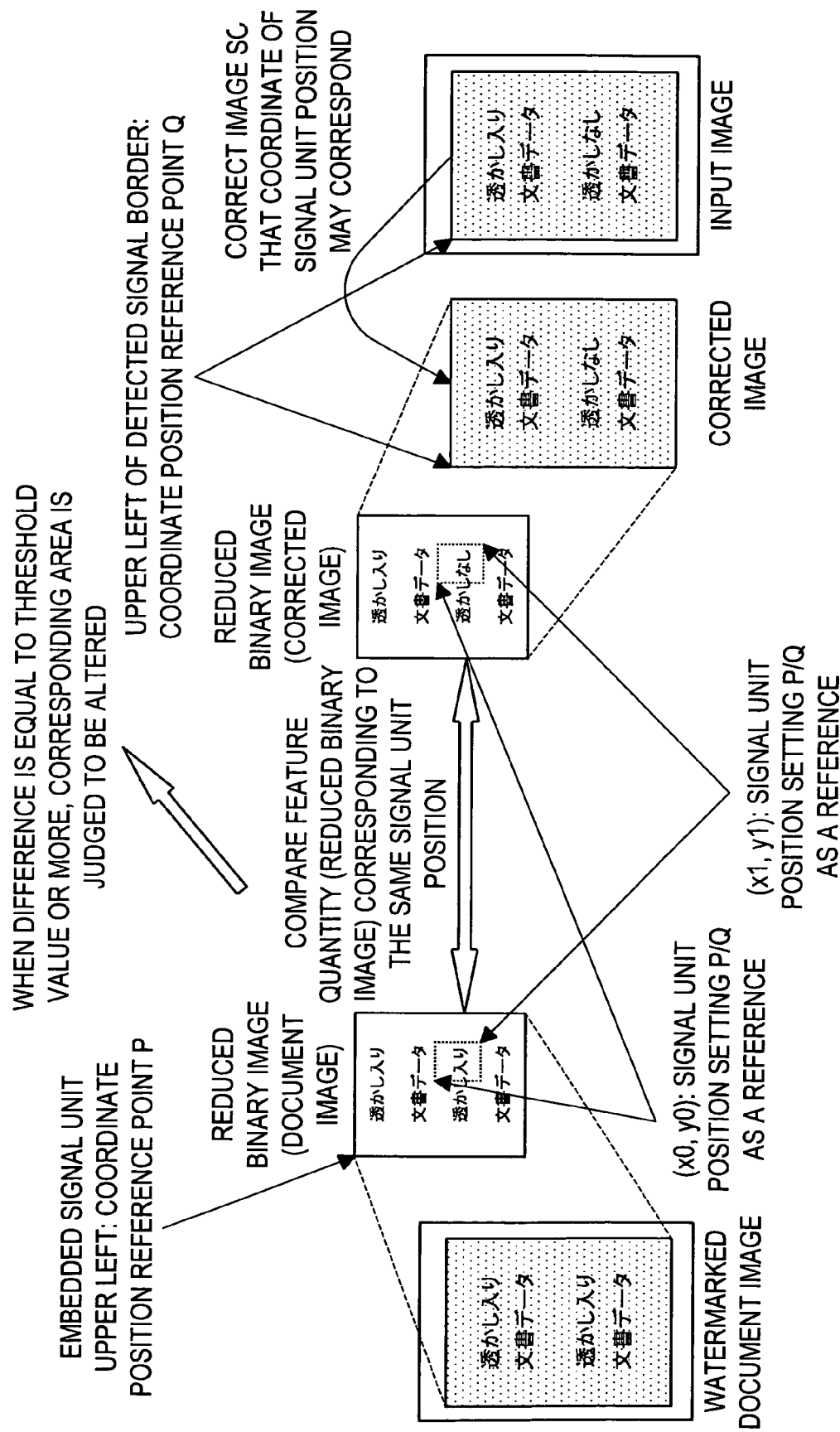
FIG. 29 is an explanatory diagram of a feature comparing step (step S450).

In addition, when calculating the reduced image, after setting the upper left coordinate of the signal border as a reference point (a reference point Q in FIG. 29), dividing plural signal units as one unit and creating the corrected image of input image to which the coordinate position corresponds in the unit, the corrected image may be reduced.

<Feature Quantity Comparing Step (step S450)>

In step S450, comparing the features obtained in the document image feature quantity extracting step (step S420) and the input image feature quantity creating step (step S440), and in the case of not matching, it is judged that the printed document corresponding to the position is altered. More specifically, the alteration is judged by comparing the reduced binary image of the input image in a unit of the signal unit obtained in step S440 (rectangle setting a coordinate (xs, ye)-(xs, ye) as an upper left/lower right vertex with the reference point Q in FIG. 28) with the reduced binary image of the corresponding document image extracted in the document image feature quantity extracting step (step S420) (rectangle setting a coordinate (xs, ys)-(xe, ye) as an upper left/lower right vertex with the reference point P in FIG. 28). When the number of pixels with different luminance values is equal to a predetermined threshold value or more in two images to be compared with each other, for example, it is only necessary to judge that the printed image corresponding to the signal unit is altered.

Although a reduced binary image is used as a feature quantity in the above embodiment, it is applicable to use coordinate information and text data in a printed document instead. In this case, referring the data of the input image corresponding to the coordinate information, performing character recognition for the image information by using a well-known OCR technology and comparing the recognition result with the text data, the alteration can be judged.

ADVANTAGE OF FIFTH EMBODIMENT

According to this embodiment as described above, comparing the feature quantity of the document image embedded in advance with the feature quantity of the input image obtained by reading by a scanner the printed document with confidential information embedded, based on the signal unit determined by using the signal position searching template, makes it possible to detect the alteration of the contents of the printed document. The signal unit position can be correctly obtained according to the first embodiment, which alters the comparison of feature quantity and makes it possible to judge the alteration of the printed document.

Although the preferred embodiment of the watermark information detecting method according to the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

According to the present invention as described above, the signal unit position can be obtained in order for the sum of filter output value to be maximum by performing filtering process on the whole surface of the input image and by using a signal position searching template. Accordingly, even when the image is expanded or contracted due to displacement of paper, etc., the signal unit position can be correctly detected and confidential information can be correctly detected from the document including confidential information.

INDUSTRIAL APPLICABILITY

The present invention is applicable to a method of adding confidential information in a form other than character to a document image, and relates to a technology of detecting confidential information from a printed document including confidential information.

The invention claimed is:

1. A watermark information detecting method comprising:
    an image inputting step for reading a printed document with confidential information embedded as an input image, by preparing plural dot patterns with a direction of wave and/or wavelength changed according to an arrangement of dots, giving one symbol to one of the dot patterns and arranging the dot patterns combined with each other;
    a filtering step for obtaining, in each pixel of the input image, a filter type matrix related to a type of detection filter with a maximum output value among all detection filters and a filter output value matrix related to the output value of the detection filter, by performing filtering of the input image after preparing the detection filter having the same wave direction and wavelength as the dot patterns to be the same number of types in order to detect the dot patterns from the input image;
    a position searching step for determining the position of the dot patterns in order for the sum of the output values of the detection filter corresponding to a grid point of a position searching template to be maximum, while moving the position searching template in each area divided in a predetermined size with regard to the filter output value matrix;
    a symbol determining step for obtaining a symbol matrix by determining the symbol of the dot patterns embedded in a location determined in the position searching step from the type of the detection filter in the filter type matrix, corresponding to the location;
    a border determining step for determining a border of the area; and
    an information decoding step for decoding the confidential information embedded in the printed document based on the dot patterns embedded inside the border.

2. A watermark information detecting method according to claim 1, wherein, in the border determining step, the border of the area is determined by the dot patterns embedded based on the predetermined dot patterns embedded in the printed document in advance.

3. A watermark information detecting method according to claim 1, wherein, in the border determining step, a row and a column with the specific dot patterns embedded are determined as the border of the area with the confidential information embedded, for the row and the column in the symbol matrix.

4. A watermark information detecting method according to claim 1, wherein the position searching step comprises an initial position searching step for searching the initial position of the position searching template for detecting the dot patterns with high degree of accuracy.

5. A watermark information detecting method according to claim 4, wherein, in the initial position searching step, the initial position of the position searching template is determined at almost the central position of the input image.

6. A watermark information detecting method according to claim 4, wherein, in the initial position searching step, the initial position of the position searching template is determined at the position with most nondense distribution of a pixel with small luminance value of the input image.

7. A watermark information detecting method according to claim 1, wherein, in the position searching step, the position of the dot patterns is determined by referring to the output value of the detection filter at the neighborhood as well as the output value of the detection filter at the position of the dot patterns to be determined, when searching the position of the dot patterns by the position searching template.

8. A watermark information detecting method according to claim 1 further comprising:
    a dot pattern number decoding step for decoding information on the number of dot patterns embedded in the printed document from the input image; and
    a position correcting step for correcting the position of the dot patterns when the number of the dot patterns detected from the input image does not match the number of the dot patterns decoded in the dot pattern number decoding step.

9. A watermark information detecting method according to claim 1 further comprising an alteration detecting step including a step of extracting a feature quantity of the printed document and a step of calculating the feature quantity of the input image.

10. A watermark information detecting method according to claim 9, wherein the alteration detecting step further comprises a step of binarizing the input image for binarizing the input image per area in accordance with a binarized parameter per area embedded in the printed document.

11. A watermark information detecting method according to claim 1, wherein, in the border determining step, the dot patterns that can be searched from the symbol matrix are determined in advance between embedding means and detecting means in the confidential information, to determine the border based on the dot patterns.

12. A watermark information detecting method comprising:
    an image inputting step for reading a printed document with confidential information embedded as an input image, by preparing plural dot patterns depicting waves having wave directions that are changed according to symbols assigned to the dot patterns and by arranging the dot patterns in combination with each other;
    a filtering step for obtaining, in each pixel of the input image, a filter type matrix related to a type of detection filter with a maximum output value among all detection filters and a filter output value matrix related to the output value of the detection filter, by performing filtering of the input image after preparing the detection filter having the same wave direction as the dot patterns to be the same number of types in order to detect the dot patterns from the input image;
    a position searching step for determining the position of the dot patterns using a position searching template, while moving the position searching template with regard to a filter output value matrix;
    a symbol determining step for obtaining a symbol matrix by determining the symbol assigned to the dot patterns at locations determined in the position searching step;
    a border determining step for determining a border of the printed document; and an information decoding step for decoding the confidential information embedded in the printed document based on the dot patterns embedded inside the border.

13. A watermark information detecting method according to claim 12, wherein the position searching step comprises an initial position searching step for searching an initial position of the position searching template for detecting the dot patterns.

14. A watermark information detecting method according to claim 13, wherein, in the initial position searching step, the initial position of the position searching template is determined at almost the central position of the input image.

15. A watermark information detecting method according to claim 12, wherein, in the position searching step, the position of the dot patterns comprises the step of referring to the output values of the detection filters.

16. A watermark information detecting method according to claim 12, wherein the waves additionally have wavelengths that are changed.

17. A watermark information detecting method comprising:
    an image inputting step for reading a printed document with confidential information embedded as an input image, by preparing plural dot patterns depicting waves having wavelengths that are changed according to symbols assigned to the dot patterns and by arranging the dot patterns in combination with each other;
    a filtering step for obtaining, in each pixel of the input image, a filter type matrix related to a type of detection filter with a maximum output value among all detection filters and a filter output value matrix related to the output value of the detection filter, by performing filtering of the input image after preparing the detection filter having the same wavelength as the dot patterns to be the same number of types in order to detect the dot patterns from the input image;
    a position searching step for determining the position of the dot patterns using a position searching template, while moving the position searching template with regard to a filter output value matrix;
    a symbol determining step for obtaining a symbol matrix by determining the symbol assigned to the dot patterns at locations determined in the position searching step;
    a border determining step for determining a border of the printed document; and an information decoding step for decoding the confidential information embedded in the printed document based on the dot patterns embedded inside the border.

18. A watermark information detecting method according to claim 17, wherein the position searching step comprises an initial position searching step for searching an initial position of the position searching template for detecting the dot patterns.

19. A watermark information detecting method according to claim 18, wherein, in the initial position searching step, the initial position of the position searching template is determined at almost the central position of the input image.

20. A watermark information detecting method according to claim 17, wherein, in the position searching step, the position of the dot patterns comprises the step of referring to the output values of the detection filters.

* * * * *